(12) United States Patent
Minato

(10) Patent No.: US 9,671,796 B2
(45) Date of Patent: Jun. 6, 2017

(54) PRESSURE GOVERNOR AND AIR DRYER

(75) Inventor: Ichirou Minato, Tokyo (JP)

(73) Assignee: NABTESCO AUTOMOTIVE CORPORATION, Tokyo (JP)

(*) Notice: Subject to any disclaimer, the term of this patent is extended or adjusted under 35 U.S.C. 154(b) by 281 days.

(21) Appl. No.: 14/007,497

(22) PCT Filed: Mar. 12, 2012

(86) PCT No.: PCT/JP2012/056280
§ 371 (c)(1),
(2), (4) Date: Sep. 25, 2013

(87) PCT Pub. No.: WO2012/132859
PCT Pub. Date: Oct. 4, 2012

(65) Prior Publication Data
US 2014/0014201 A1    Jan. 16, 2014

(30) Foreign Application Priority Data

Mar. 25, 2011 (JP) ................................. 2011-068260
May 27, 2011 (JP) ................................. 2011-119448

(51) Int. Cl.
*F15B 13/042* (2006.01)
*G05D 16/10* (2006.01)
(Continued)

(52) U.S. Cl.
CPC ........... *G05D 16/106* (2013.01); *B01D 53/26* (2013.01); *B60T 17/00* (2013.01); *B60T 17/004* (2013.01);
(Continued)

(58) Field of Classification Search
CPC ....... G05D 16/106; B01D 53/26; F16K 11/22; B60T 17/00; B60T 17/004;
(Continued)

(56) References Cited

U.S. PATENT DOCUMENTS 2,571,420 A * 10/1951 Nellie .................. B60T 17/004
137/204
3,545,887 A * 12/1970 Kobnick ................. F04C 28/24
137/115.14

(Continued)

FOREIGN PATENT DOCUMENTS

EP           0530019 A     3/1993
JP          H01-65634 U    10/1987
(Continued)

OTHER PUBLICATIONS

International Search Report mailed Jun. 12, 2012 for the corresponding PCT Application No. PCT/JP2012/056280.
(Continued)

*Primary Examiner* — Mary McManmon
*Assistant Examiner* — Minh Le
(74) *Attorney, Agent, or Firm* — Leason Ellis LLP

(57) ABSTRACT

A pressure governor includes a first valve that determines the introducing pressure and a second valve that determines the releasing pressure. A first valve receiving chamber in which the first valve is received and a second valve receiving chamber in which the second valve is received are formed independently from each other. Thus, there is no need to form the valves coaxially, and each valve can be easily fabricated with high accuracy by simple processing.

17 Claims, 18 Drawing Sheets

(51) Int. Cl.
*B01D 53/26* (2006.01)
*F16K 11/22* (2006.01)
*B60T 17/00* (2006.01)

(52) U.S. Cl.
CPC .......... *F16K 11/22* (2013.01); *Y10T 137/7793* (2015.04)

(58) Field of Classification Search
CPC ........... Y10T 137/7793; Y10T 137/777; Y10T 137/7762; Y10T 137/7832; Y10T 137/7838; Y10T 137/87917; Y10T 137/2544
USPC .... 137/596, 492.5, 613, 102, 488, 506, 512; 96/128
See application file for complete search history.

(56) References Cited

U.S. PATENT DOCUMENTS

| | | | | |
|---|---|---|---|---|
| 3,670,756 | A * | 6/1972 | Schultz | B60T 15/50 137/102 |
| 3,834,837 | A * | 9/1974 | Nickell | F04B 39/125 137/102 |
| 5,027,847 | A * | 7/1991 | Snyder | G05D 16/10 137/119.09 |
| 5,378,266 | A * | 1/1995 | Elamin | B60T 17/004 95/21 |
| 5,458,676 | A * | 10/1995 | Herbst | B60T 17/004 96/109 |
| 5,458,677 | A * | 10/1995 | VanderMolen | B60T 17/004 96/113 |
| 5,575,541 | A * | 11/1996 | Elamin | B60T 17/004 303/1 |
| 5,592,754 | A * | 1/1997 | Krieder | B01D 53/261 34/527 |
| 5,647,731 | A * | 7/1997 | Onozawa | F04B 49/03 417/295 |
| 5,694,965 | A * | 12/1997 | Roulet | G05D 16/10 137/102 |
| 6,074,462 | A * | 6/2000 | Quinn | B01D 53/0415 55/DIG. 17 |
| 6,120,107 | A * | 9/2000 | Eslinger | B01D 53/26 303/1 |
| 6,785,980 | B1 * | 9/2004 | Koelzer | B60T 17/004 34/218 |
| 2004/0244845 | A1 | 12/2004 | Koyama | |
| 2005/0258680 | A1 * | 11/2005 | Blackwood | B60T 17/004 303/2 |
| 2012/0285327 | A1 * | 11/2012 | Schal | B60T 17/02 96/113 |
| 2012/0325327 | A1 * | 12/2012 | Eggebrecht | B01D 53/266 137/1 |
| 2013/0036912 | A1 * | 2/2013 | Clair | B01D 53/0415 96/118 |
| 2013/0062541 | A1 * | 3/2013 | Diekmeyer | B60T 13/683 251/12 |
| 2013/0259719 | A1 * | 10/2013 | Ichihara | F04B 41/02 417/364 |

FOREIGN PATENT DOCUMENTS

| | | |
|---|---|---|
| JP | 10-296038 A | 11/1998 |
| JP | 03-322337 B | 9/2002 |
| JP | 2004-360876 A | 12/2004 |
| JP | 2005-284645 A | 10/2005 |
| JP | 2008-253898 A | 10/2008 |
| JP | 2009-078760 A | 4/2009 |
| WO | WO-99/43527 A | 9/1999 |
| WO | WO-2004/098969 A | 11/2004 |

OTHER PUBLICATIONS

Extended European Search Report mailed Apr. 29, 2016 for the corresponding European Patent Application No. 12765715.3.
Office Action mailed Jul. 6, 2016 for the corresponding Japanese Patent Application No. 2015-099129.

* cited by examiner

Introducing pressure - before reaching releasing pressure
*First valve 11: closed
*Second valve 12: closed
*Compressor: load mode Introducing pressure - before reaching releasing pressure
*First valve 11: open
*Second valve 12: closed
*Compressor: load mode After reaching releasing pressure - immediately before reaching introducing pressure
*First valve 11: open
*Second valve 12: open
*Compressor: unload mode Immediately after reaching introducing pressure
*First valve 11: closed
*Second valve 12: open
*Compressor: start loading Introducing pressure - before reaching releasing pressure
*First valve 11: closed
*Second valve 12: closed
*Compressor: load mode Introducing pressure - reaching releasing pressure
*First valve 11: closed
*Second valve 12: closed
*Compressor: load mode Introducing pressure - before reaching releasing pressure
*First valve 11: open
*Second valve 12: closed
*Compressor: load mode After reaching releasing pressure - immediately before reaching introducing pressure
*First valve 11: open
*Second valve 12: open
*Compressor: unload mode Immediately after reaching introducing pressure
*First valve 11: closed
*Second valve 12: open
*Compressor: start loading

PRESSURE GOVERNOR AND AIR DRYER

CROSS-REFERENCE TO RELATED PATENT APPLICATIONS

This application is a U.S. National Phase Application under 35 U.S.C. §371 of International Patent Application No. PCT/JP2012/056280, filed Mar. 12, 2012, and claims the benefit of Japanese Patent Applications No. 2011-068260, filed Mar. 25, 2011, and No. 2011-119448, filed May 27, 2011, all of which are incorporated by reference in their entities herein. The International Application was published in Japanese on Oct. 4, 2012 as International Publication No. WO/2012/132859 under PCT Article 21(2).

FIELD OF THE INVENTION

The present invention relates to a pressure governor that outputs a control order pressure from a control output port based on the air pressure in an input port into which air is input. The present invention also relates to an air dryer, which is provided with the pressure governor, for drying treatment of air.

BACKGROUND OF THE INVENTION

An air dryer for removing moisture and oil in the compressed air output from an air compressor in a brake system for a large-size automobile, for example, is known. Some air dryers incorporate a pressure governor, which outputs a control order to an air compressor outside the air dryer or to a drain valve in the air dryer based on the air pressure received from an air tank for storing dry air and maintains the pressure in the air tank within a prescribed range (refer to Patent Literature 1, for example).

RELATED ART DOCUMENT

Patent Literature

[Patent Literature 1] JP 2008-253898 A

Problem to be Solved by the Invention

For the purpose of clarifying the problem to be solved by the invention, the constitution of the pressure governor disclosed in Patent Literature 1 is described with reference to FIG. 18. FIG. 18 is a cross-sectional view of a pressure governor 120 according to the related art disclosed in Patent Literature 1.

Part of the air supplied to an air tank (not shown) is supplied to the pressure governor 120. The pressure governor 120 outputs an order pressure to open a drain valve (not shown) located at a lower part of an air dryer (not shown) when the pressure of the air reaches a prescribed upper limit pressure (which may be hereinafter referred to as "releasing pressure"). When the drain valve is opened, the air supplied from an air compressor is discharged through the drain valve, thereby preventing the pressure in the air tank from increasing above a specified pressure.

When the pressure of the air supplied to the air tank decreases to a prescribed lower limit pressure (which may be hereinafter referred to as "introducing pressure"), the output of the order pressure to open the drain valve is stopped, and the drain valve is closed and the pressure governor 120 is shifted to a mode where air is supplied to the air tank again.

The structure of the pressure governor 120, which perform the above functions, is described below. The pressure governor 120 is provided with a governor piston 122 that slides in a hollow chamber 120a formed in a base member 101. The governor piston 122 receives the biasing force from a compression spring 121 at one axial end and the pressure of compressed air from the air tank at the other axial end via an IN port 129.

The compression spring 121 is located in an exhaust chamber 120e to which an exhaust passage 126 of the pressure governor 120 is connected. When the air pressure acting on the governor piston 122 is equal to or lower than a prescribed pressure (releasing pressure), the governor piston 122 is located, by the biasing force from the compression spring 121, in such a position that a control port 123 is communicated with the exhaust passage 126 via a central passage of an exhaust stem 124 and the exhaust chamber 120e.

When the air pressure in the air tank increases, and the force exerted by the pressure acting on the governor piston 122 exceeds the biasing force from the compression spring 121, the governor piston 122 is moved in a direction to compress the compression spring 121. With this movement, the central passage of the exhaust stem 124 is closed by a governor valve 125, whereby the control port 123, from which a control pressure is output to the drain valve, is shut off from the atmosphere.

When the air pressure in the air tank further increases and reaches a prescribed releasing pressure, the governor piston 122 further compresses the compression spring 121. As a result, the governor valve 125 is opened via the exhaust stem 124. When the governor valve 125 is opened, the compressed air supplied from the air tank via the IN port 129 is supplied onto the upper face of the drain valve through the control port 123 and pushes the drain valve open.

After that, when the air pressure in the air tank gradually decreases and reaches a prescribed introducing pressure, the governor piston 122 is pressed back by the biasing force from the compression spring 121 and the governor valve 125 is closed. At this time, the exhaust stem 124 is moved away from the governor valve 125, so the compressed air in the control port 123 is released into the atmosphere from the exhaust passage 126 through the central passage of the exhaust stem 124 and the drain valve is closed.

The difference between the releasing pressure and the introducing pressure of the conventional pressure governor 120 is determined by the difference between the seal diameter (which determines the releasing pressure) of a seal ring designated by reference numeral 131, and the seal diameter (which determines the introducing pressure) of a seal ring designated by reference numeral 130. Thus, a prescribed inner diameter difference is provided between an inner peripheral surface 133 with which the seal ring 131 is in contact and an inner peripheral surface 132 with which the seal ring 130 is in contact.

The inner diameter difference (in other words, the difference between the releasing pressure and the introducing pressure) is set based on the specifications required by the user. However, because the inner diameter difference is often vary small (for example, 1 mm or less) and because the inner peripheral surface 132 and the inner peripheral surface 133 need to be formed coaxially with each other, the processing is difficult and causes a decrease in production yield.

In addition, because of the structure in which the releasing pressure and the introducing pressure are determined by valves which operate coaxially, the governor valve 125, the exhaust stem 124 and the like must be incorporated in the governor piston 122, resulting in complexity of the valve structure and cost increase.

SUMMARY OF THE INVENTION

The present invention has been made in view of such circumstances. An object of the present invention is to provide a pressure governor in which both the releasing pressure and the introducing pressure can be easily determined with high accuracy and which reduces a production cost with its simplified structure.

Means for Solving the Problem

For the purpose of accomplishing the above object, a first aspect of the present invention provides a pressure governor which includes an input port into which air is input and a control output port from which a control order pressure is output to outside the pressure governor, and the pressure governor does not output the control order pressure from the control output port during a process where an air pressure in the input port increases from a first pressure to a second pressure higher than the first pressure, outputs the control order pressure from the control output port during a process where the air pressure in the input port decreases to the first pressure after reaching the second pressure, and stops the output of the control order pressure when the air pressure in the input port returns to the first pressure.

The pressure governor further includes, a first valve provided in a first valve chamber to determine the first pressure, and a second valve provided in a second valve chamber communicated with the first valve chamber to determine the second pressure.

According to this aspect, the pressure governor includes, a first valve that determines the first pressure (introducing pressure), and a second valve that is received in a second valve chamber different from a first valve chamber in which the first valve is received and that determines the second pressure (releasing pressure). Thus, because there is no need to form the first and second valves coaxially, each valve can be easily fabricated with high accuracy by simple processing. Therefore, the production yield can be improved and the cost can be reduced. In addition, because the entire structure of the pressure governor can be simplified, the cost can be further reduced accordingly.

A second aspect of the present invention provides the pressure governor according to the first aspect, in which the first valve includes a first piston for receiving the air pressure from the input port, and first biasing means for biasing the first piston in a direction to close the first valve against the air pressure from the input port;

the second valve includes a second piston for receiving the air pressure from the first valve chamber, and second biasing means for biasing the second piston in a direction to close the second valve against the air pressure from the first valve chamber;

the first valve and the second valve are both kept closed or only the first valve is opened from this state during the process where the air pressure in the input port increases from the first pressure to the second pressure higher than the first pressure to shut off an airflow path from the input port to the control output port;

the first valve and the second valve are both kept open to keep the airflow path open during the process where the air pressure in the input port decreases to the first pressure after reaching the second pressure; and the first valve is closed to shut off the airflow path when the air pressure is returned to the first pressure.

According to this aspect, the first valve and the second valve both have what is called a normally closed structure. Thus, the constitution of both the first valve and the second valve can be simplified, and the cost for the pressure governor can be further reduced accordingly.

A third aspect of the present invention provides the pressure governor according to second aspect, in which the first valve chamber is divided by the first piston into, a first end side space in which the first biasing means is housed, and a second end side space on an opposite side with respect to the first piston, the first end side space being communicated with an atmosphere;

an internal passage, which communicates a communication passage for communicating the first valve chamber and the second valve chamber, when the first valve is closed, with the first end side space, is formed in the first piston; and air on the control output port side is released into the atmosphere through the communication passage and the internal passage, when the air pressure in the input port is returned to the first pressure to close the first valve and before the second valve is closed.

According to this aspect, the air on the control output port side is released into the atmosphere through the first valve when the air pressure returns to the first pressure (introducing pressure), the air on the control output port side can be quickly released into the atmosphere.

A fourth aspect of the present invention provides the pressure governor according to the third aspect, in which the second valve chamber is divided, by the second piston into, a first end side space in which the second biasing means is housed, and a second end side space on the opposite side with respect to the second piston, the first end side space being communicated with the atmosphere;

an atmosphere communication path, which communicates the control output port with the first end side space of the second valve chamber to open the control output port to the atmosphere with the second valve closed is, formed in the valve body of the pressure governor; and the atmosphere communication path is shut off by the second piston when the second piston is moved to open the second valve.

According to this aspect, the control output port is opened to the atmosphere via the second valve with the second valve closed. Thus, there is no need to provide an additional valve to atmospherically open the control output port, in a load mode of a compressor, and therefore the cost for the entire pressure can be reduced.

A fifth aspect of the present invention is the pressure governor according to any one of second aspect to fourth aspect, wherein at least one of, a seal ring which performs a sealing function between an interior wall of the first valve chamber and the first piston, and a seal ring which performs a sealing function between an interior wall of the second valve chamber and the second piston, is provided in the interior wall of the corresponding valve chamber.

According to this aspect, a seal ring which performs a sealing function between the interior wall of the valve chamber and the piston is provided not on the piston but in the interior wall of the valve in at least one of the first valve and the second valve. Thus, the seal ring is prevented from unevenly abutting on the interior wall of the valve chamber when the piston is inclined in the valve chamber. This significantly improves the slidability of the pistons and improves the service life of the seal rings.

A sixth aspect of the present invention provides an air dryer for drying air, including a pressure governor according to any one of first aspect to fifth aspects.

According to this aspect, the same effect as that of any one of the first to fifth aspects can be achieved.

An air dryer according to a seventh aspect of the present invention provides a pressure governor, which includes a first valve that determines an introducing pressure and a second valve that is located independently at a different location from the first valve and determines a releasing pressure.

The first valve and the second valve may be a piston type or a diaphragm type. The opening and closing pressures of the first valve and the second valve can be adjusted independently. The phrase "located independently at a different location" means that, the first valve chamber in which a first governor piston constituting the first valve, and the second valve chamber in which a second governor piston constituting the second valve, are forming independent spaces separated by a wall, and the valve chambers are communicated with each other via an airflow path. Thus, the two governor pistons do not have to move along a common axis.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Embodiment for Carrying Out the Invention

Description is hereinafter made of embodiments of the present invention with reference to the drawings. The following embodiments are described on the assumption that each embodiment described below is merely one embodiment of the present invention and is not intended to limit the present invention.

First Embodiment of Present Invention

Figure 1:
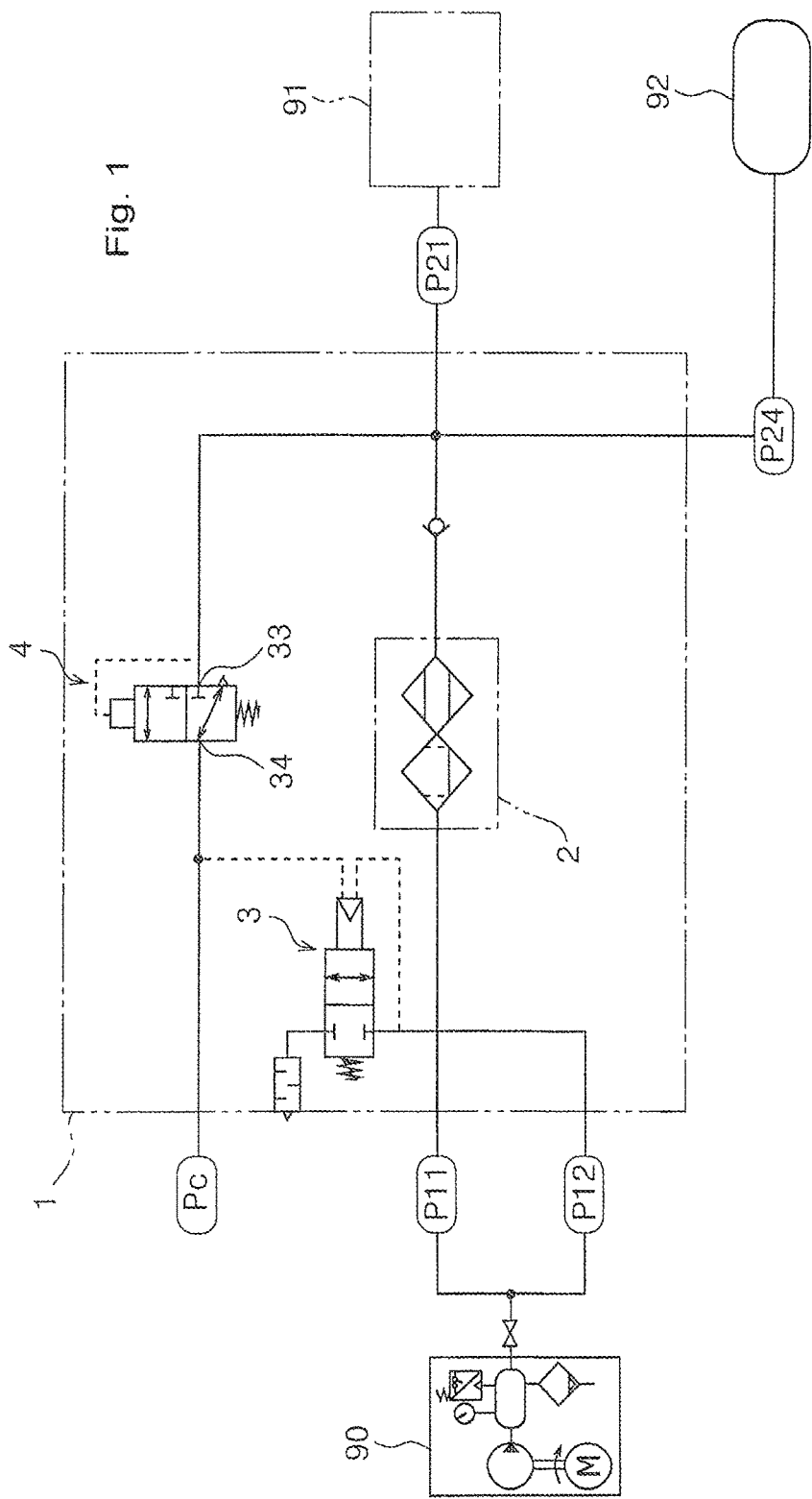
FIG. 1 is a circuit diagram of an air dryer according to the present invention.
Figure 2:
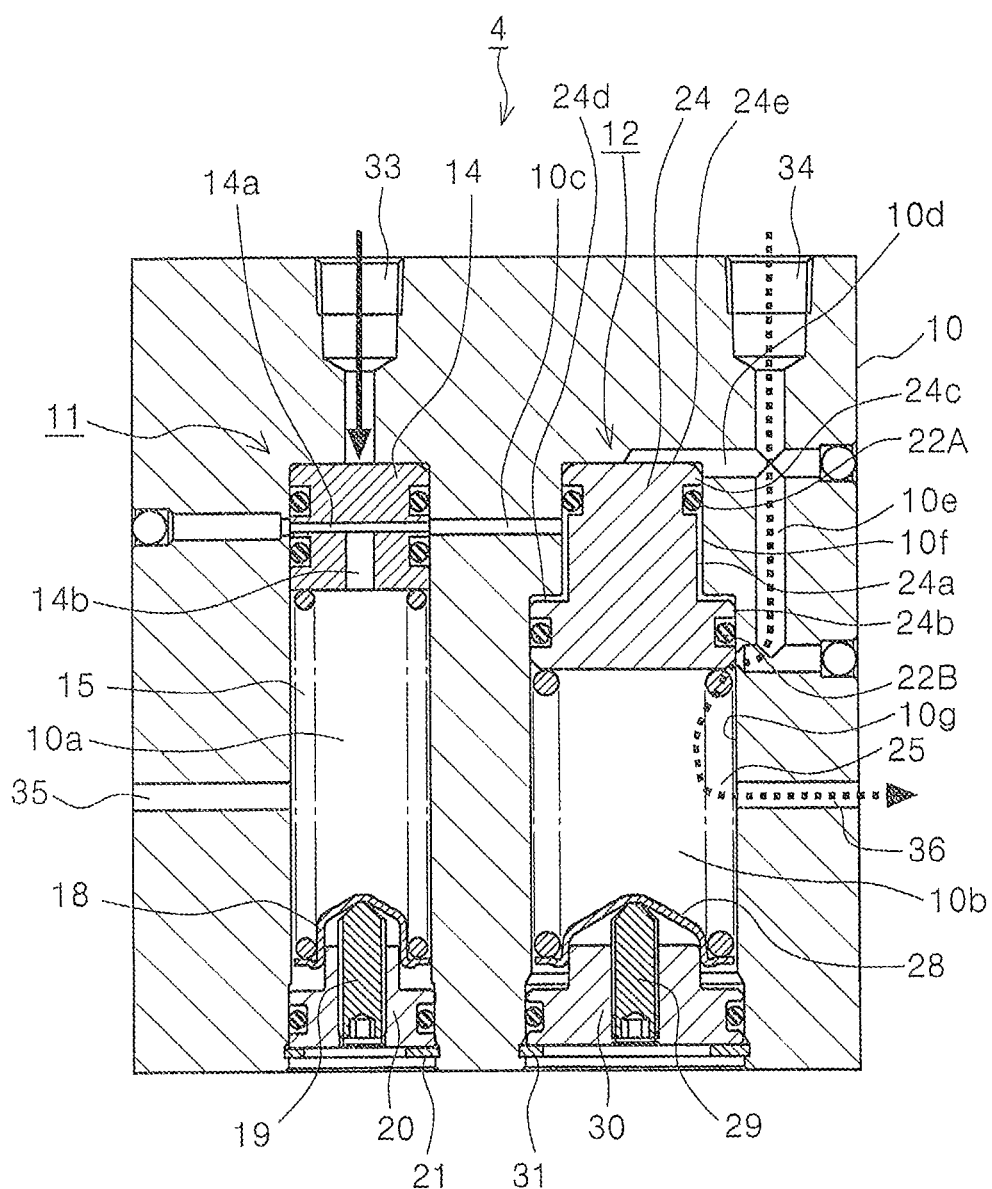
FIG. 2 is a cross-sectional view of a pressure governor according to a first embodiment of the present invention (first valve: closed, second valve: closed).
Figure 3:
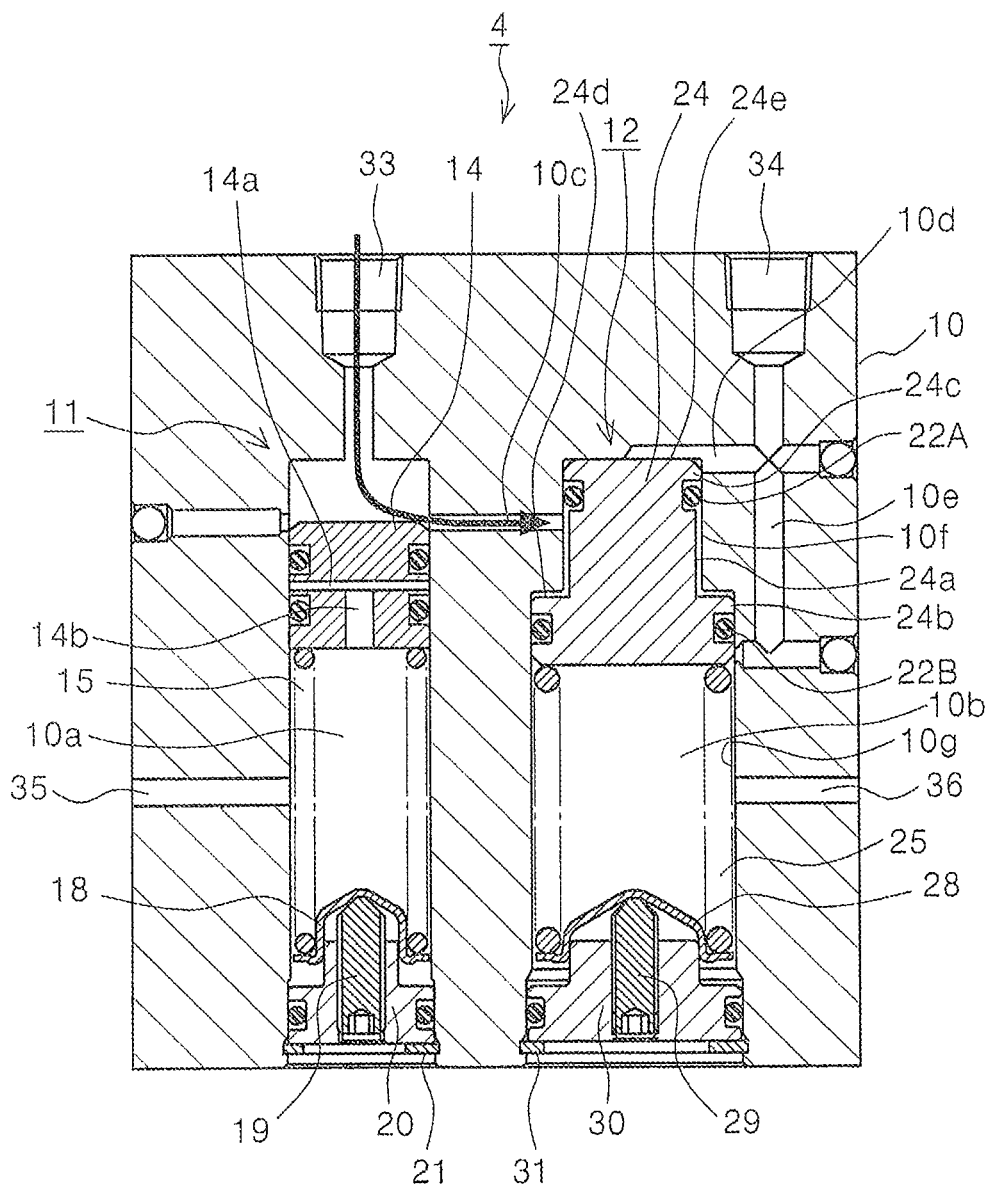
FIG. 3 is a cross-sectional view of the pressure governor according to the first embodiment of the present invention (first valve: open, second valve: closed).
Figure 4:
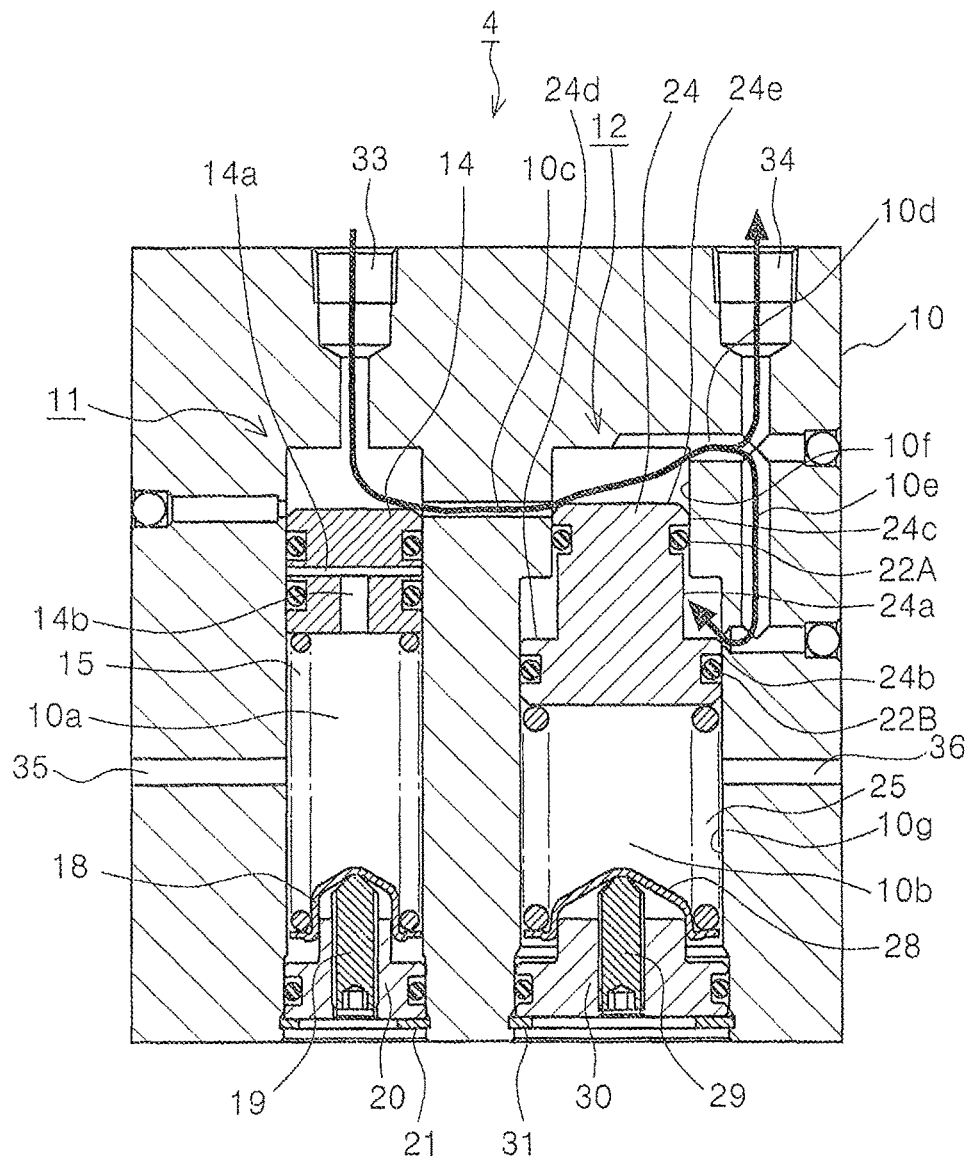
FIG. 4 is a cross-sectional view of the pressure governor according to the first embodiment of the present invention (first valve: open, second valve: open).
Figure 5:
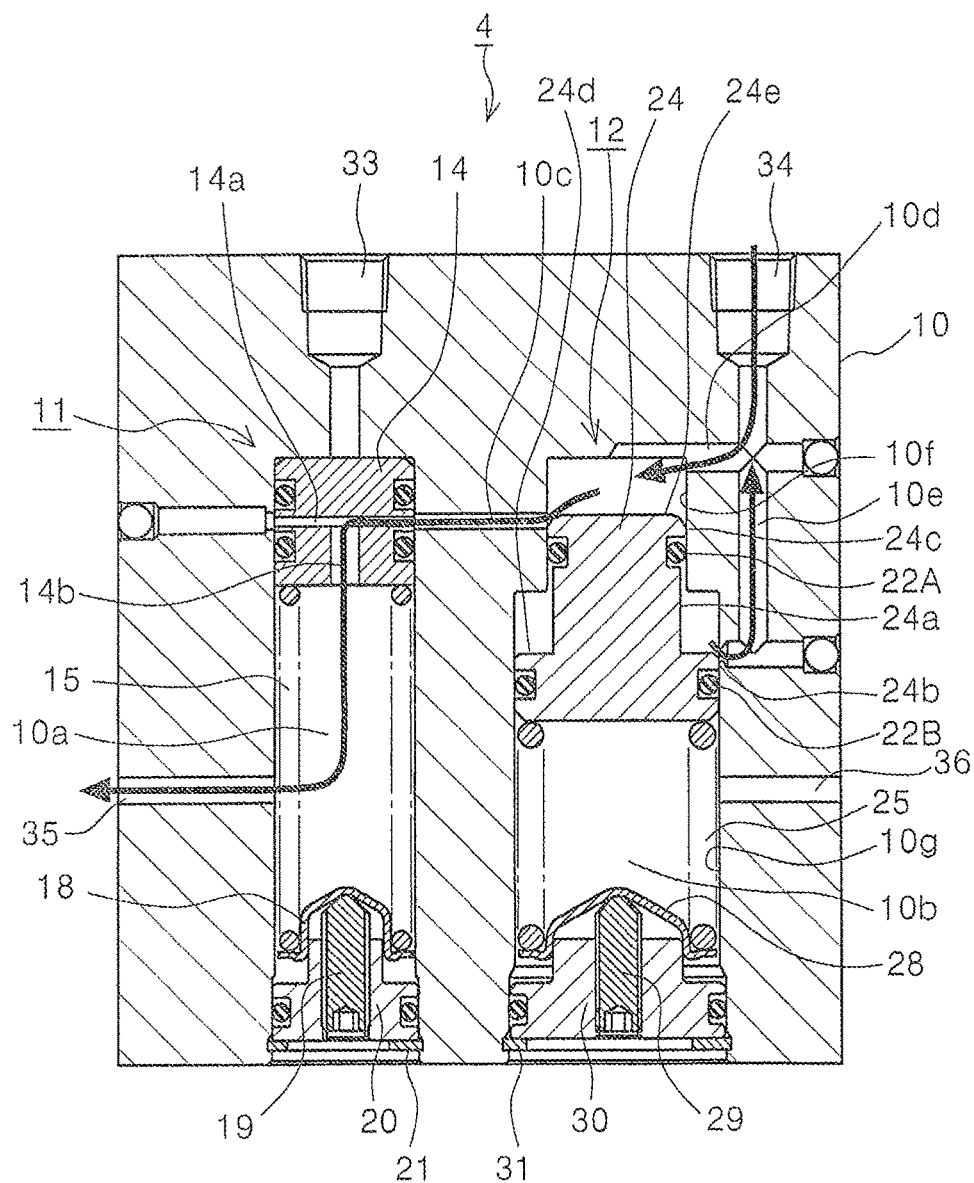
FIG. 5 is a cross-sectional view of the pressure governor according to the first embodiment of the present invention (first valve: closed, second valve: open).

FIG. 1 is a circuit diagram of an air dryer 1 according to the present invention. FIG. 2 to FIG. 5 are cross-sectional views of a pressure governor 4 according to a first embodiment of the present invention. FIG. 2 shows a state where a first valve 11 is in a closed (valve-closed) position and a second valve 12 is in a closed (valve-closed) position. FIG. 3 shows a state where the first valve 11 is in an open (valve-open) position and the second valve 12 is in a closed (valve-closed) position. FIG. 4 shows a state where the first valve 11 is in an open (valve-open) position and the second valve 12 is in an open (valve-open) position. FIG. 5 shows a state where the first valve 11 is in a closed (valve-closed) position and the second valve 12 is an open (valve-open) position. The pressure governor 4 operates in the order of FIG. 2 FIG. 3→FIG. 4→FIG. 5→FIG. 2 (operation is performed in the same order hereinafter).

The general constitution of the air dryer 1 is first described briefly with reference to FIG. 1. In FIG. 1, symbols P11 and P12 designate input ports into which compressed air output from an air compressor 90 is delivered. Compressed air is introduced into the air dryer 1 through the input ports P11 and P12.

Moisture and oil are removed from the compressed air introduced into the air dryer 1 in a drying unit 2, and the compressed air is then output from output ports P21 and P24. The compressed air output from the output port P21 is supplied to an air drive unit (not shown), such as an air brake, via a protection valve 91. The compressed air output from the output port P24 is supplied to an air tank 92.

Part of the compressed air, from which moisture and oil have been removed in the drying unit 2, is also supplied to the pressure governor 4, which is incorporated in the air dryer 1. When the dry air output from the air dryer 1 reaches a prescribed releasing pressure, the pressure governor 4 outputs an control order pressure from a control output port 34 (which is described later) toward an output port Pc in order to shift an air compressor 90 in the air dryer 1 into an unload mode. The control order pressure is also delivered to an exhaust valve 3 to open the exhaust valve 3.

When the exhaust valve 3 is opened, the compressed air supplied from the air compressor 90 is discharged from the exhaust valve 3, in other words, the supply of compressed air to the drying unit 2 is stopped. At this time, by the effect of reduced pressure the dry air in the drying unit 2 is directed in the opposite direction from that during drying treatment, whereby the oil filter (not shown) in the drying unit 2 is cleaned and the moisture and oil accumulated in the exhaust valve 3 are discharged to the outside together with the air. At this time, the desiccant (not shown in FIG. 1) is regenerated because the dry air in the drying unit 2 removes moisture from the desiccant (not shown in FIG. 1) in the drying unit 2 when discharged to the outside.

Then, the dry air input into the pressure governor 4 decreases to a prescribed introducing pressure, the exhaust valve 3 is closed and compressed air is supplied to the drying unit 2 again, whereby the drying treatment of compressed air in the drying unit 2 is restarted.

For convenience sake, the state where the exhaust valve 3 is closed and dry air is supplied to the external air tank 92 is herein referred to as "load mode of compressor," and the state where the exhaust valve 3 is open and no dry air is supplied to the external air tank 92 is herein referred to as "unload mode of compressor."

Constitution of the drying unit 2, the exhaust valve 3 and the protection valve 91 described above are the same as known devices.

The above is the description of the general constitution of the air dryer 1, and the pressure governor 4 according to a first embodiment of the present invention is described below with reference to FIG. 2 to FIG. 5.

The pressure governor 4 shown in FIG. 2 to FIG. 5 is provided with an input port 33 into which the compressed air from the air tank 92 is input and a control output port 34 from which a control order pressure is output to the exhaust valve 3.

One function of the pressure governor 4 is to keep an airflow path, which extends from the input port 33 to the control output port 34, in a shut off state during the process where the pressure of the compressed air input into the input port 33 increases from an introducing pressure (first pressure) to a releasing pressure (second pressure) which is higher than the introducing pressure. During the process where the pressure of the compressed air input into the input port 33 reaches the releasing pressure and then decreases to the introducing pressure, the pressure governor 4 keeps the airflow path open. After that, when the pressure of the compressed air input into the input port 33 returns to the introducing pressure, the pressure governor 4 shuts off the airflow path.

More specifically, a first valve chamber 10a and a second valve chamber 10b are formed in a governor body 10 constituting the base body of the pressure governor 4. An upper part of the first valve chamber 10a and an upper part of the second valve chamber 10b are communicated with each other via a passage 10c, whereby the input port 33, an upper part of the first valve chamber 10a, an upper part of the second valve chamber 10b, and the control output port 34 are communicated with each other.

<<Constitution of First Valve 11>>

A first valve 11 which determines the introducing pressure of the pressure governor 4 is provided in the first valve chamber 10a. The first valve 11 includes a first piston 14, a coil spring 15 as first biasing means, a spring seat 18, an adjusting screw 19, a base 20, and a stopper 21.

The first piston 14 is received in the first valve chamber 10a for sliding movement in a vertical direction of the drawing, and biased upward as viewed in the drawing (in the valve-closing direction) by the coil spring 15. Thus, the first valve chamber 10a is divided into a first end side space in which the coil spring 15 is housed (the space below the first piston 14 in the drawing) and a second end side space on the opposite side (the space above the first piston 14 in the drawing: this space is not created when the first piston 14 is in a valve-closed position). The first end side space, in which the coil spring 15 is housed, is open to the atmosphere via an exhaust passage 35.

The spring seat 18 can be moved in a vertical direction of the drawing by the adjusting screw 19 threaded into a screw hole of the base 20 fixed by the stopper 21. Accordingly, the biasing force with which the coil spring 15 biases the first piston 14 (in other words, the introducing pressure of the pressure governor 4) is adjustable.

<<Constitution of Second Valve 12>>

A second valve 12 which determines the releasing pressure of the pressure governor 4 is provided in the second valve chamber 10b. The second valve 12 includes a second piston 24, a coil spring 25 as second biasing means, a spring seat 28, an adjusting screw 29, a base 30, and a stopper 31.

The second piston 24 is received in the second valve chamber 10b for sliding movement in a vertical direction of the drawing, and biased upward as viewed in the drawing (in the valve-closing direction) by the coil spring 25. Thus, the second valve chamber 10b is divided into a first end side space in which the coil spring 25 is housed (the space below the second piston 24 in the drawing) and a second end side space on the opposite side (the space above the second piston 24 in the drawing: however, this space is not created when the second piston 24 is in a valve-closed position). The first end side space, in which the coil spring 25 is housed, is open to the atmosphere via an exhaust passage 36.

The spring seat 28 can be moved in a vertical direction of the drawing by the adjusting screw 29 threaded into a screw hole of the base 30 fixed by the stopper 31. Accordingly, the biasing force with which the coil spring 25 biases the second piston 24 (in other words, the releasing pressure of the pressure governor 4) is adjustable.

Contrary to the first valve chamber 10a, the diameter of an upper part of the second valve chamber 10b is smaller than that of the rest of the second valve chamber 10b. In other words, the second valve chamber 10b includes an upper small-diameter portion 10f and a lower large-diameter portion 10g, and the second piston 24 also includes an upper small-diameter portion 24a and a lower large-diameter portion 24b, accordingly.

The gap between the large-diameter portion 24b of the second piston 24 and the corresponding large-diameter portion 10g of the second valve chamber 10b is sealed by a seal ring 22B. However, a clearance is formed between the small diameter portion 24a of the second piston 24 and the corresponding small diameter portion 10f of the second valve chamber 10b, whereby the upper face (designated by symbol 24d) of the large-diameter portion 24b functions as a pressure receiving face for receiving the air pressure from the first valve chamber 10a side.

An intermediate-diameter portion 24c with a diameter larger than that of the small diameter portion 24a is formed at the upper end of the small diameter portion 24a of the second piston 24, and the gap between the small diameter portion 24a of the second piston 24 and the small diameter portion 10f of the second valve chamber 10b is sealed by a seal ring 22A. Thus, the upper face of the second piston 24 (designated by symbol 24e) functions as a pressure receiving face for receiving the air pressure from the first valve chamber 10a side.

<<Operation of Pressure Governor 4>>

In the pressure governor 4 constituted as described above, the first valve 11 and the second valve 12 are both held in a valve-closed position (both are normally closed) during the process of reaching the releasing pressure after reaching the introducing pressure (load mode of the compressor 90). FIG. 2 shows the state during this process. The compressed air is being input into the input port 33 (solid-line arrow in FIG. 2) but the pressure has not reached a level high enough to press down the first piston 14.

At this time, the control output port 34 is communicated with a lower space in the second valve 12 via an atmosphere communication path 10e formed in the governor body 10 (the second piston 24 is in such a position as not to shut off the atmosphere communication path 10e). In other words, the control output port 34 is open to the atmosphere via the second valve 12 (the dotted-line arrow in FIG. 2).

When the pressure of the compressed air input into the input port 33 increases, the first piston 14 is pressed down and the first valve 11 is opened as shown in FIG. 3. Then, the compressed air flows into the second valve 12 through the passage 10c (solid-line arrow in FIG. 3), and a pressure receiving face 24d of the second piston 24 receives the air pressure. In this state, however, the second valve 12 is closed because the releasing pressure of the second valve 12 has not been reached.

When the air pressure further increases and reaches the releasing pressure of the second valve 12, the second piston 24 is pressed down and the second valve 12 is opened as shown in FIG. 4. Then, the airflow path leading from the input port 33 via the first valve 11, the passage 10c, the second valve 12, and a passage 10d to the control output port 34 is brought into an open state from a shutoff state, and a control order pressure is output from the control output port 34. In this state, air also flows into the space around the small diameter portion 24a of the second piston 24 through the atmosphere communication path 10e (solid-line arrow in FIG. 4), and the pressure receiving face 24d receives the air pressure, whereby the second valve 12 is kept open.

When the pressure of the compressed air input into the input port 33 gradually decreases and reaches the introducing pressure of the first valve 11, the first valve 11 is closed as shown in FIG. 5. At this time, because internal passages 14a, 14b are formed in the first piston 14, the compressed air remaining at a downstream side of the control output port 34 is quickly discharged to the atmosphere through the passage 10d, the second valve 12, the passage 10c, the internal passages 14a, 14b, the first valve chamber 10a, and the exhaust passage 35 as indicated by solid-line arrows in FIG. 5. At this time, the air around the small diameter portion 24a of the second piston 24 also escapes through the atmosphere communication path 10e. Then, when the second piston 24 is restored to its original position, the pressure governor 4 returns to the state shown in FIG. 2 from the state shown in FIG. 5.

As describe above, according to the present invention, the pressure governor 4 includes the first valve 11, which determines the introducing pressure (first pressure), and the second valve 12, which determines the releasing pressure (second pressure) and which is provided in the second valve chamber 10b independent from the first valve chamber 10a, in which the first valve 11 is received. Thus, because there is no need to form the first and second valves coaxially, each valve can be easily fabricated with high accuracy by simple processing. Therefore, the production yield can be improved and the cost can be reduced. In addition, because the entire structure of the pressure governor can be simplified, the cost can be further reduced, accordingly.

In addition, the introducing pressure and the releasing pressure can be easily adjusted afterward by using the adjusting screws 19 and 29, respectively, even after the production is completed. Thus, the production yield can be improved dramatically because there is no possibility that a below-standard pressure governor is produced because of production variations.

In addition, the first valve 11 and the second valve 12 both have a normally-closed structure in this embodiment. Thus, the constitution of both the first valve 11 and the second valve 12 can be simplified, and the cost for the entire pressure governor can be further reduced accordingly.

Second Embodiment of Present Invention

Figure 6:
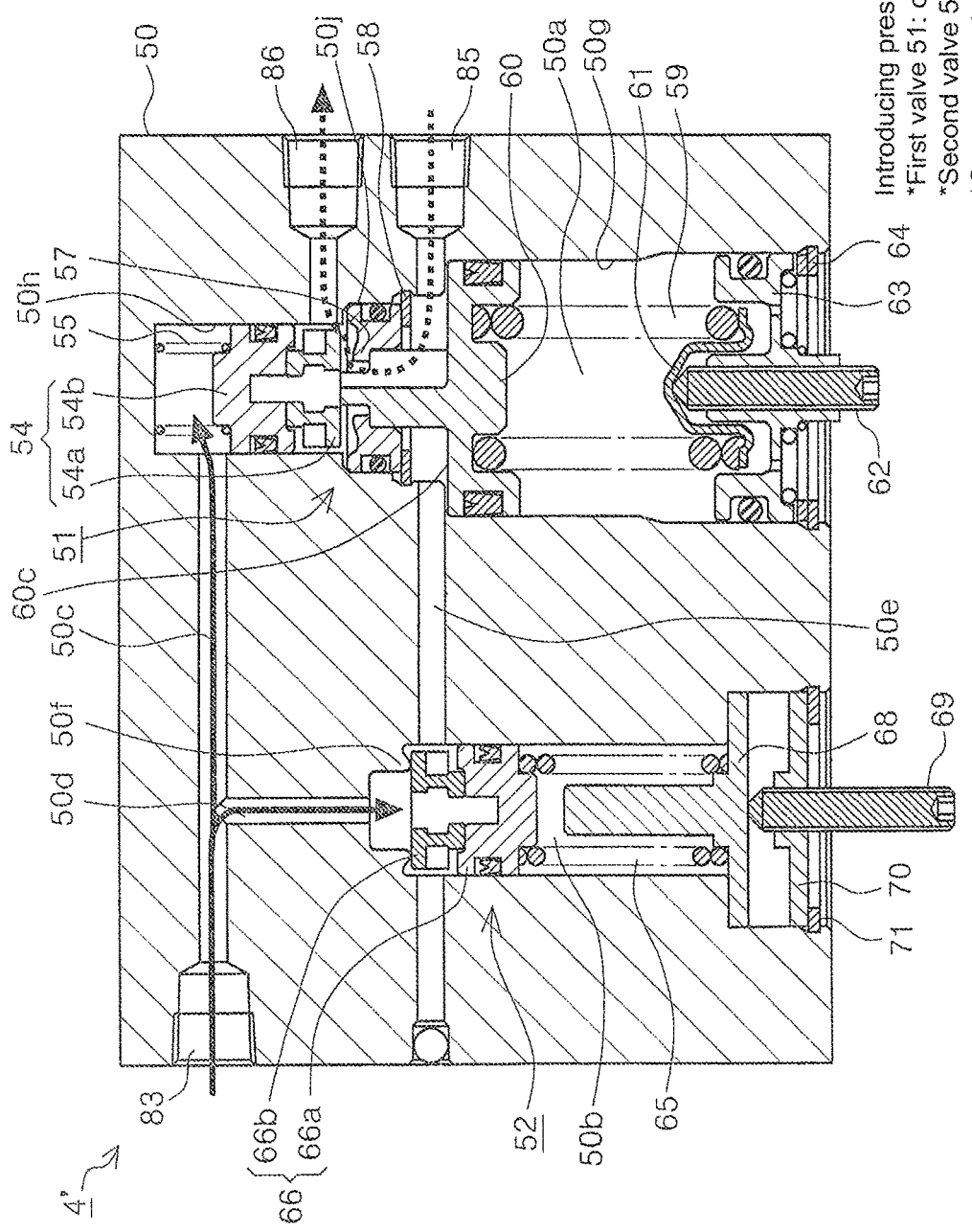
FIG. 6 is a cross-sectional view of a pressure governor according to a second embodiment of the present invention (first valve: open, second valve: closed).
Figure 7:
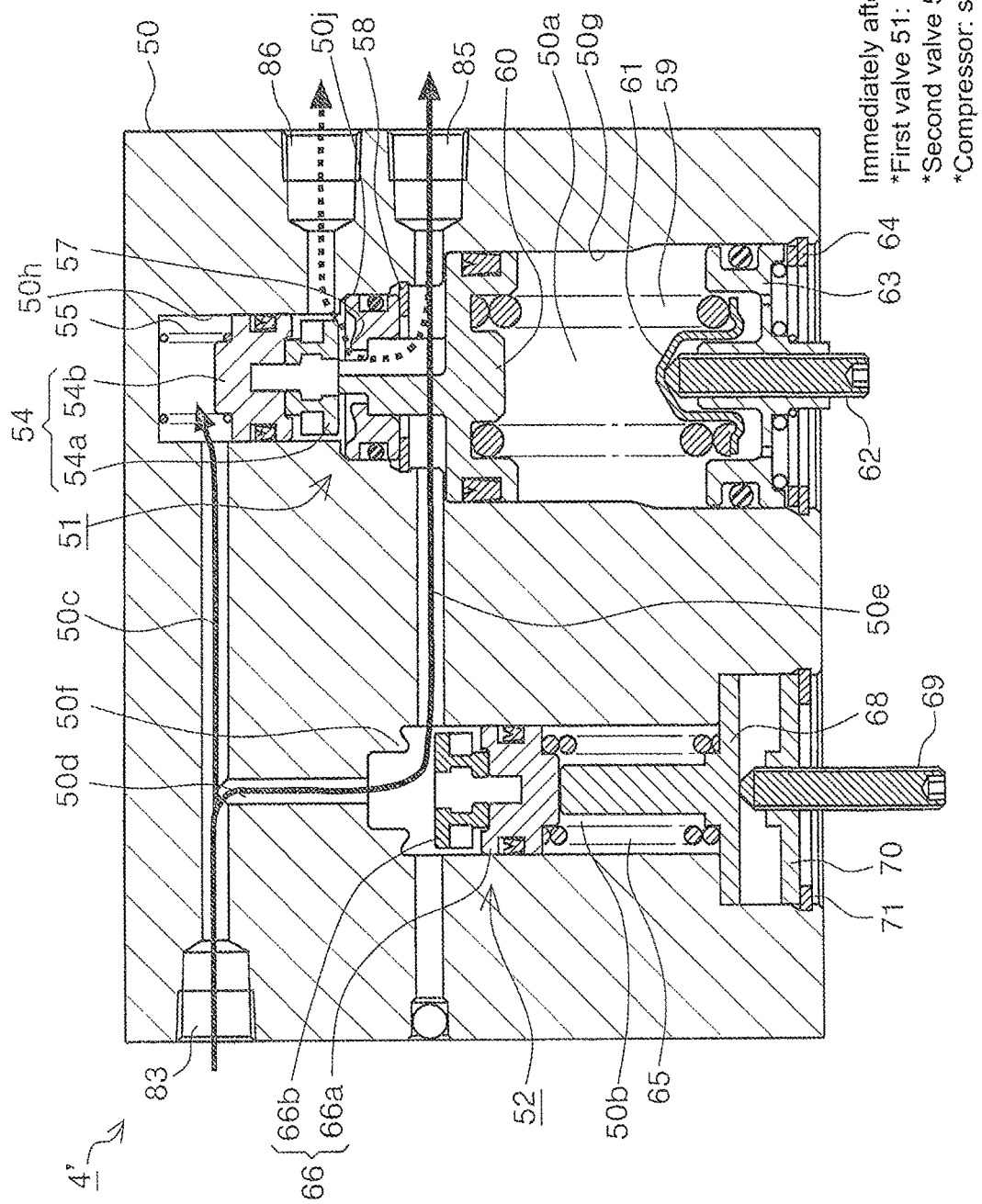
FIG. 7 is a cross-sectional view of the pressure governor according to the second embodiment of the present invention (first valve: open, second valve: open).
Figure 8:
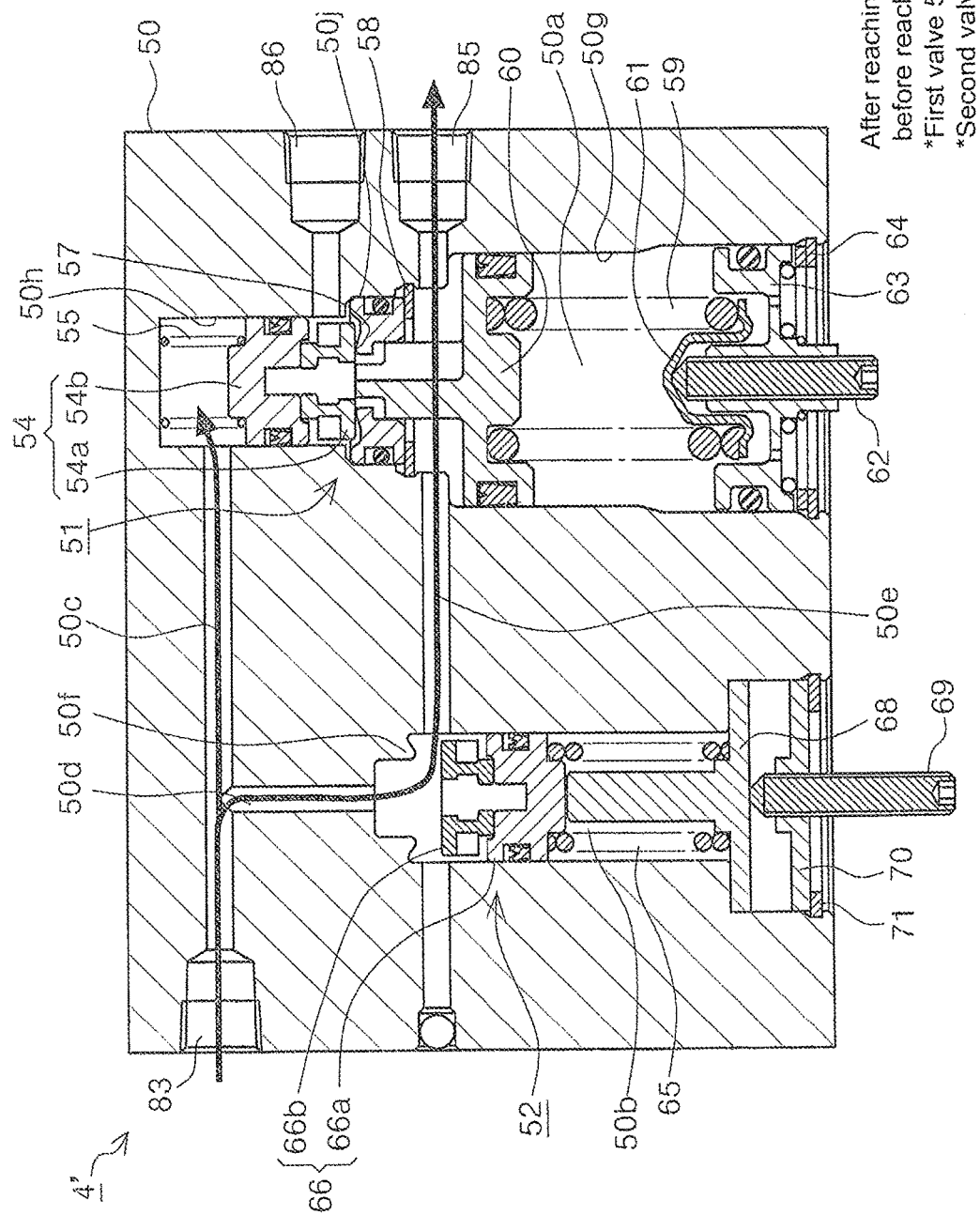
FIG. 8 is a cross-sectional view of the pressure governor according to the second embodiment of the present invention (first valve: closed, second valve: open).
Figure 9:
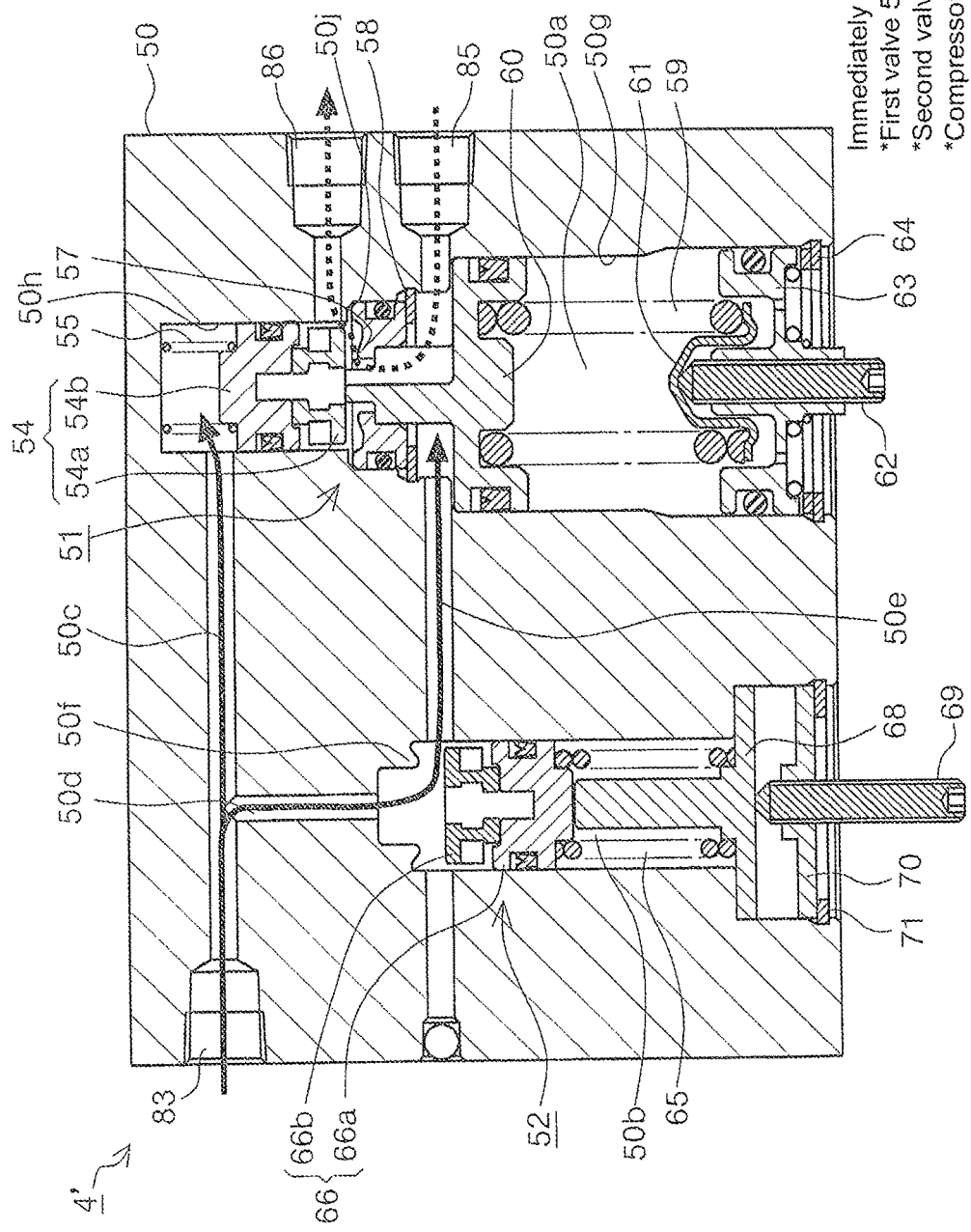
FIG. 9 is a cross-sectional view of the pressure governor according to the second embodiment of the present invention (first valve: open, second valve: open).

A pressure governor 4' according to a second embodiment of the present invention is next described with reference to FIG. 6 to FIG. 9. FIG. 6 to FIG. 9 are cross-sectional views of the pressure governor 4' according to a second embodiment of the present invention. FIG. 6 shows a state where a first valve 51 is in an open (valve-open) position and a second valve 52 is in a closed (valve-closed) position. FIG. 7 shows a state where the first valve 51 is in an open (valve-open) position and the second valve 52 is in an open (valve-open) position. FIG. 8 shows a state where the first valve 51 is in a closed (valve-closed) position and the second valve 52 is in an open (valve-open) position. FIG. 9 shows a state where the first valve 51 is in an open (valve-open) position and the second valve 52 is in an open (valve-open) position. The pressure governor 4' operates in the order of FIG. 6→FIG. 7→FIG. 8→FIG. 9→FIG. 6 (operation is repeated in the same order hereinafter).

The pressure governor 4' shown in FIG. 6 to FIG. 9 is different from the pressure governor 4 according to the first embodiment described above in that the first valve 51 which determines the introducing pressure has a normally-open structure and the second valve 52 which determines the releasing pressure has a normally-closed structure.

The structure of the pressure governor 4' is described in detail below. The pressure governor 4' is provided with an input port 83 into which the compressed air from the air tank 92 is input, and a control output port 85 from which a control order pressure is output.

The pressure governor 4' keeps shut an airflow path from the input port 83 to the control output port 85 during the process where the pressure of the compressed air input into the input port 83 increases from an introducing pressure (first pressure) to a releasing pressure (second pressure) which is higher than the introducing pressure. Then, during the process where the pressure of the compressed air input into the input port 83 decreases to the introducing pressure after reaching the releasing pressure, the pressure governor 4 keeps the airflow path open. After that, when the pressure returns to the introducing pressure, the pressure governor 4' shuts off the airflow path again.

More specifically, a first valve chamber 50a and a second valve chamber 50b are formed in a governor body 50 constituting the base body of the pressure governor 4', and the input port 83 is communicated with an upper part of the first valve chamber 50a and an upper part of the second valve chamber 50b by passages 50c and 50d, respectively.

Also, an upper part of the second valve chamber 50*b* is communicated with an intermediate part of the first valve chamber 50*a* by a passage 50*e*. Reference numeral 86 designates an exhaust port for opening to the atmosphere.

<<Constitution of First Valve 51>>

A first valve 51 which determines the introducing pressure of the pressure governor 4' is provided in the first valve chamber 50*a*. The first valve 51 includes a first piston 54, a coil spring 55 as biasing means, a valve seat 57, and a stopper 58. The first valve 51 further includes a coil spring 59 as biasing means, a control piston 60, a spring seat 61, an adjusting screw 62, a base 63, and a stopper 64.

The first valve chamber 50*a* is constituted with a lower large-diameter portion 50*g*, an upper small-diameter portion 50*h*, and an intermediate-diameter portion 50*j* between the lower large-diameter portion 50*g* and the upper small-diameter portion 50*h*. The first piston 54 is received in the upper small-diameter portion 50*h* for sliding movement in a vertical direction of the drawing, and biased downward as viewed in the drawing (in the valve-closing direction) by the coil spring 55.

The first piston 54 is constituted with a valve element portion 54*a* and a spring seat portion 54*b*, and the valve element portion 54*a* and the spring seat portion 54*b* are movable vertically together. The upper face of the spring seat portion 54*b* serves as a pressure receiving face for receiving air pressure.

A valve seat portion 57 is secured to the intermediate-diameter portion 50*j* of the first valve chamber 50*a* by the stopper 58, and the first piston 54 (valve element portion 54*a*) is brought into contact with or separated away from the valve seat portion 57 to open or close the first valve 51.

The control piston 60, which extends through the valve seat portion 57, is in contact with the first piston 54 from blow. The control piston 60 is biased upward as viewed in the drawing by the coil spring 59 as biasing means. For example, in the state shown in FIG. 6, the first piston 54 has been pressed up to a valve-open position by the control piston 60. The upper face (designated by symbol 60*c*) of the lower large-diameter portion of the control piston 60 serves as a pressure receiving face for receiving the air pressure from the second valve 52 side.

The spring seat 61 can be moved in a vertical direction of the drawing by the adjusting screw 62 threaded into a screw hole of the base 63 fixed by the stopper 64, making the biasing force with which the coil spring 59 biases the control piston 60 (in other words, the introducing pressure of the pressure governor 4') adjustable.

<<Constitution of Second Valve 52>>

A second valve 52 which determines the releasing pressure of the pressure governor 4' is provided in the second valve chamber 50*b*. The second valve 52 includes a second piston 66, a coil spring 65 as second biasing means, a spring seat 68, an adjusting screw 69, a base 70, and a stopper 71.

The second piston 66 is constituted with a valve element portion 66*a* and a spring seat portion 66*b*, which are slidably received together in a vertical direction of the drawing, and biased upward as viewed in the drawing (in the valve-closing direction) by the coil spring 65. The second piston 66 (valve element portion 66*a*) is slid vertically to contact with or separate from a valve seat portion 50*f* formed integrally with the governor body 50 to open or close the second valve 52.

The spring seat 68 can be moved vertically in the drawing by the adjusting screw 69 threaded into a screw hole of the base 70 fixed by the stopper 71, making the biasing force with which the coil spring 65 biases the second piston 66 (in other words, the releasing pressure of the pressure governor 4') adjustable.

<<Operation of Pressure Governor 4'>>

In the pressure governor 4' constituted as described above, the first valve 51 is held in a valve-open (normally open) position and the second valve 52 is held in a valve-closed (normally closed) position during the process of reaching the releasing pressure after reaching the introducing pressure (load mode of the compressor 90). FIG. 6 shows the state during this process. The compressed air is being input into the input port 83 (solid-line arrow) but the pressure has not reached a level high enough to press down the second piston 66.

In this state, a flow path from the control output port 85 to an exhaust port 86 is created and the control output port is open to the atmosphere (broken-line arrow). Also, in this state, the first piston 54 receives an air pressure and pressed in the valve-closing direction (downward as viewed in the drawing), but the first piston 54 is supported by the control piston 60 pressed by the biasing force from the coil spring 59 and held in a valve-open position because no air pressure is exerted on the control piston 60.

When the pressure of the compressed air input into the input port 83 increases and reaches the releasing pressure, the second piston 66 is pressed down and the second valve 52 is opened as shown in FIG. 7. FIG. 7 shows a state immediately after the second valve 52 is opened. When the second valve 52 is opened, air flows into the first valve chamber 50*a* via the passage 50*e*, and the airflow path from the input port 83 to the control output port 85 is brought into an open state from a shutoff state. Thus, a control order pressure is output from the control output port 85 as indicated by the solid-line arrow.

At this moment, the first valve 51 is open (broken-line arrow in FIG. 7). However, because an air pressure is exerted downward on the control piston 60 when the second valve 52 is opened, the control piston 60 is moved downward as shown in FIG. 8. Then, the first piston 54 is also moved downward and brought into contact with the valve seat portion 57, whereby the first valve 51 is closed. As a result, the open-to-atmosphere route from the control output port 85 to the exhaust port 86 is shut off.

After that, when the pressure of the compressed air input into the input port 83 gradually decreases and reaches the introducing pressure of the first valve 51, the control piston 60 and the first piston 54 are moved upward to open the first valve 51 as shown in FIG. 9. Then, the open-to-atmosphere route from the control output port 85 to the exhaust port 86 is opened, and the output of the control order pressure from the control output port 85 is stopped. After that, the second valve 52 is also closed, and the state shown in FIG. 6 is established again.

The functions of the pressure governor 4' are summarized here in terms of the states of the first valve 51 and the second valve 52. During the process where the air pressure in the input port 83 increases from the introducing pressure (first pressure) to the releasing pressure (second pressure), the first valve 51 is kept open and the second valve 52 is kept closed. Accordingly, the airflow path from the input port 83 to the control output port 85 is shut off. The open-to-atmosphere route of the control output port 85 is open.

Then, the air pressure in the input port 83 reaches the releasing pressure, the second valve 52 is first opened to open the airflow path and then the first valve 51 is closed to shut off the open-to-atmosphere route of the control output port 85. After that, during the process of decreases to the introducing pressure, the first valve 51 is held closed and the second valve 52 is held open to maintain the airflow path open. After that, when the air pressure returns to the introducing pressure, the first valve 51 is closed to open the open-to-atmosphere route of the control output port 85 and then the second valve 52 is closed to shut off the airflow path.

As described above, according to the second embodiment, there is no need to form the valve that determines the introducing pressure and the valve that determines the releasing pressure coaxially as in the case with the first embodiment described before, and each valve can be easily fabricated with high accuracy by simple processing. Therefore, the production yield can be improved and the cost can be reduced. In addition, because the entire structure of the pressure governor can be simplified, the cost can be further reduced, accordingly.

In addition, the introducing pressure and the releasing pressure can be easily adjusted afterward using the adjusting screws 62 and 69, respectively, even after the production is completed. Thus, the production yield can be improved dramatically because production of a below-standard pressure governor due to variations is avoided.

[Summary of Structure of Air Dryer According to the Present Invention and its Internal Operations]

The structure and internal operations of the air dryer according to the present invention as described above are summarized below with reference to FIG. 10 to FIG. 13. FIG. 10 to FIG. 13 are diagrams schematically illustrating the structure of the air dryer according to the present invention, and the structure and operations of the pressure governor are based on the first embodiment described above. Thus, the reference numerals in the drawings correspond to those used in the first embodiment described above.

Figure 10:
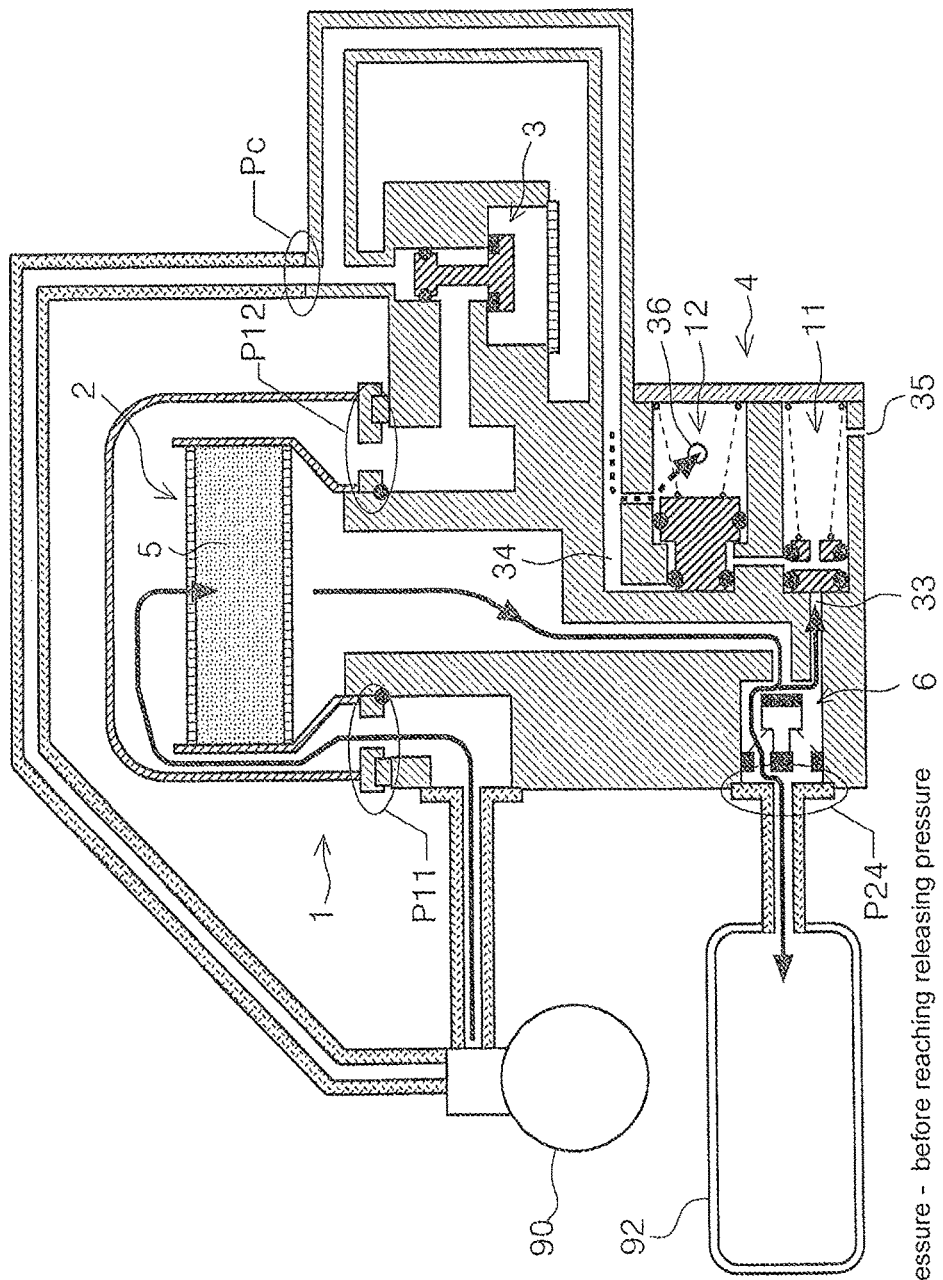
FIG. 10 is a diagram (cross-sectional view) schematically illustrating the structure of the air dryer according to the present invention.

FIG. 10 shows a state where the compressed air output from the air compressor 90 flows through the drying unit 2 having a desiccant 5, holds a check valve 6 in a valve-open position and is then supplied to the air tank 92, and the pressure governor 4 is shifting from the introducing pressure determined by the first valve 11 to the releasing pressure determined by the second valve 12. In this state, the output port Pc is open to the atmosphere via the second valve 12 of the pressure governor 4 as indicated by the broken-line arrow.

Figure 11:
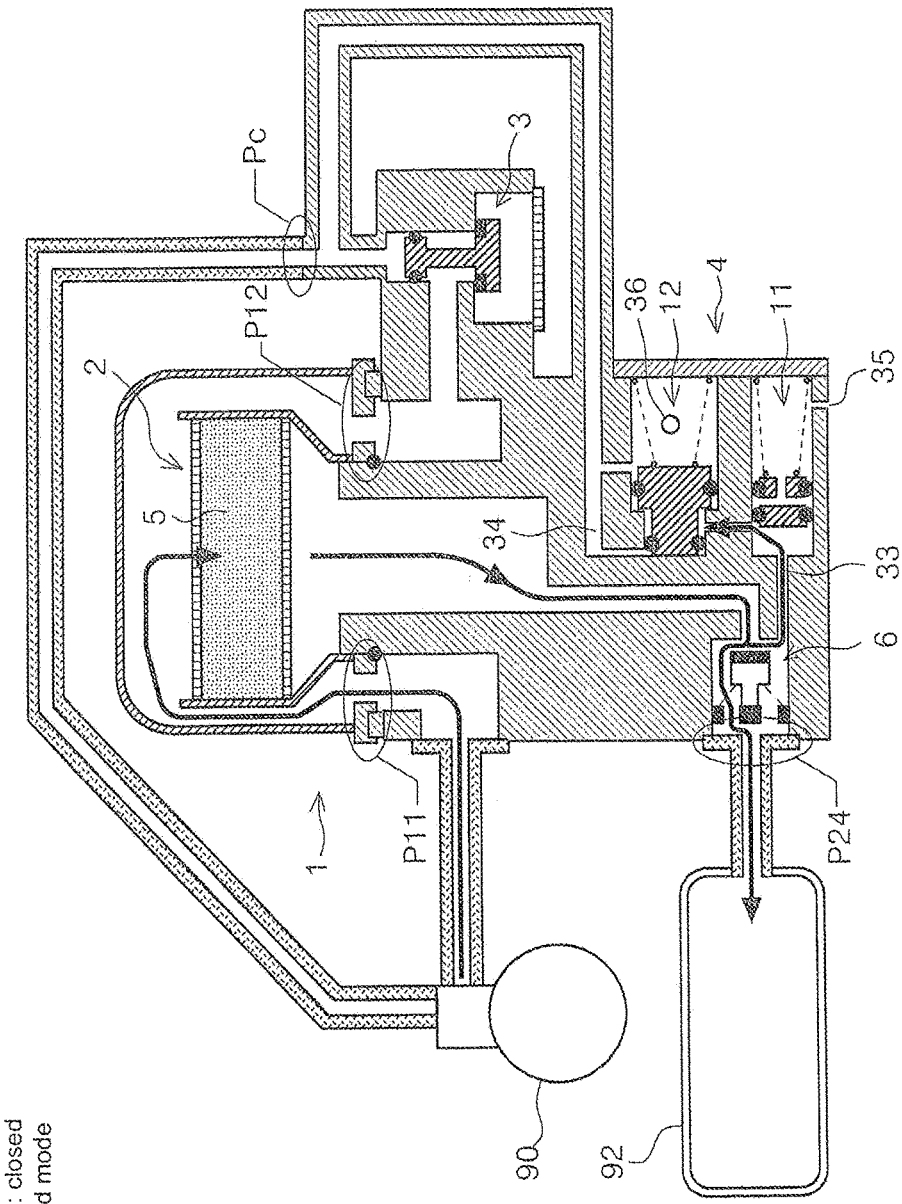
FIG. 11 is a diagram (cross-sectional view) schematically illustrating the structure of the air dryer according to the present invention.
Figure 12:
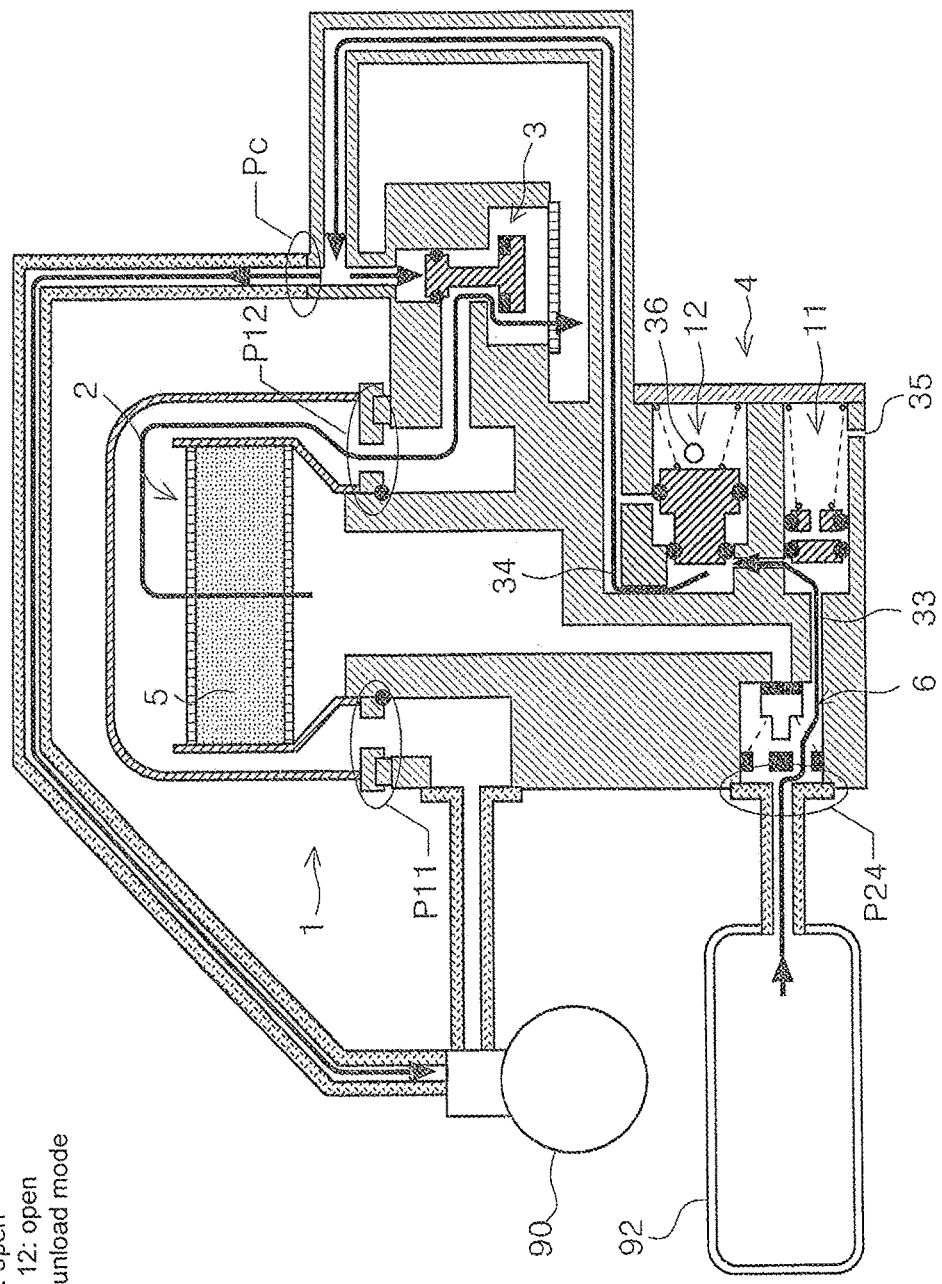
FIG. 12 is a diagram (cross-sectional view) schematically illustrating the structure of the air dryer according to the present invention.

When the pressure in the input port 33 of the pressure governor 4 further increases from this state, the first valve 11 is opened and the air pressure is also exerted on the second valve 12 as shown in FIG. 11. When the air pressure further increases and reaches the releasing pressure determined by the second valve 12, the second valve 12 is opened, and a control order pressure is output from the output port. Pc to shift the air compressor 90 into an unload mode as shown in FIG. 12. The control order pressure is also delivered to an exhaust valve 3 to open the exhaust valve 3.

Then, the dry air in the drying unit 2 flows in the opposite direction from that during the drying operation by the effect of reduced pressure, and is discharged to the outside. When the dry air is discharged to the outside, the desiccant 5 is regenerated because the dry removes moisture from the desiccant 5 in the drying unit 2.

Figure 13:
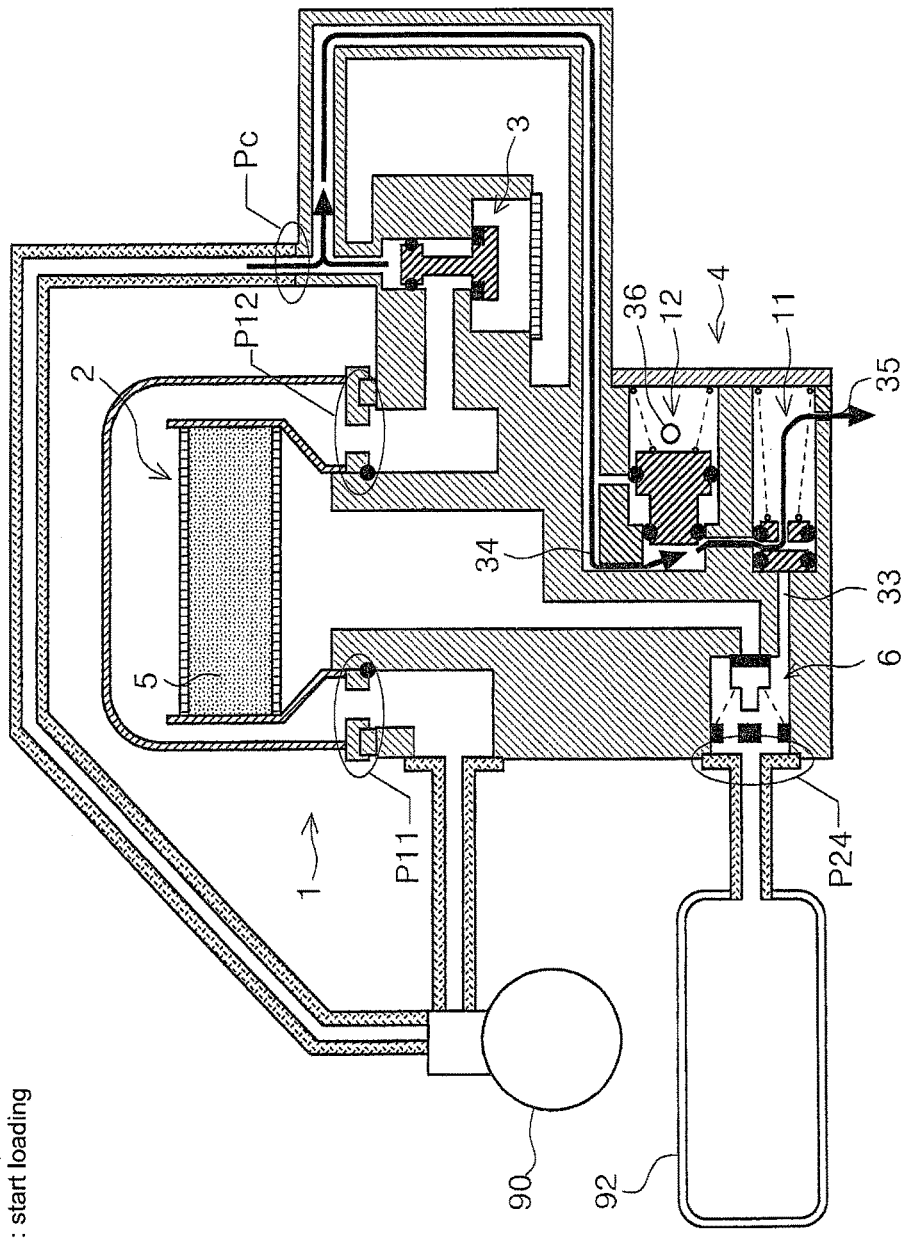
FIG. 13 is a diagram (cross-sectional view) schematically illustrating the structure of the air dryer according to the present invention.

Then, when the air input into the pressure governor 4 decreases to the introducing pressure determined by the first valve 11, the exhaust valve 3 is closed and the first valve 11 in the pressure governor 4 is closed as shown in FIG. 13. In this state, the output port Pc is opened to the atmosphere via the first valve 11. After that, when the air compressor 90 is shifted into a load mode and the second valve 12 is closed in the pressure governor 4, the load mode of the air compressor 90 as shown in FIG. 10 is restored.

Third Embodiment of Present Invention

Figure 14:
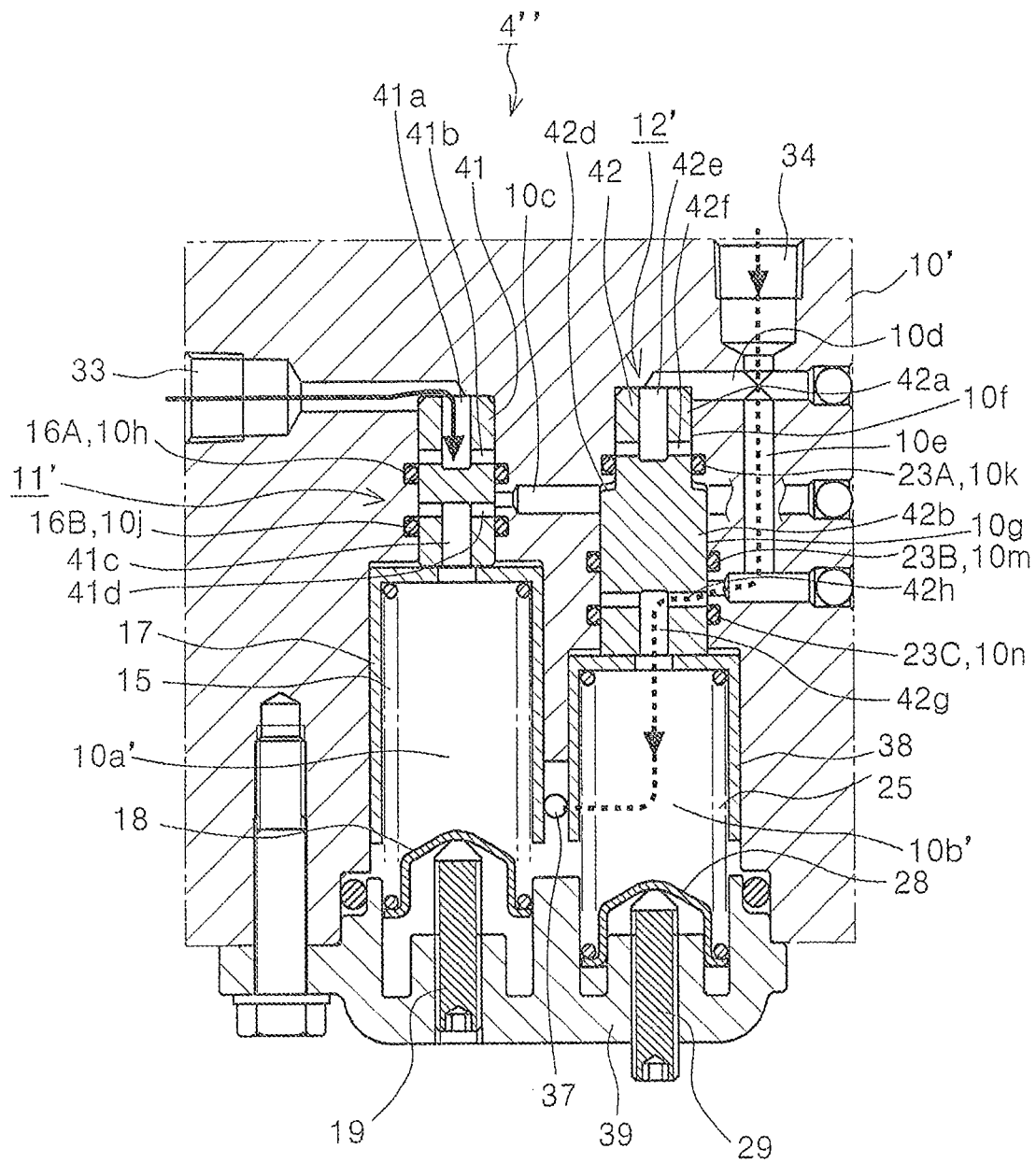
FIG. 14 is a cross-sectional view of a pressure governor according to a third embodiment of the present invention (first valve: closed, second valve: closed).
Figure 15:
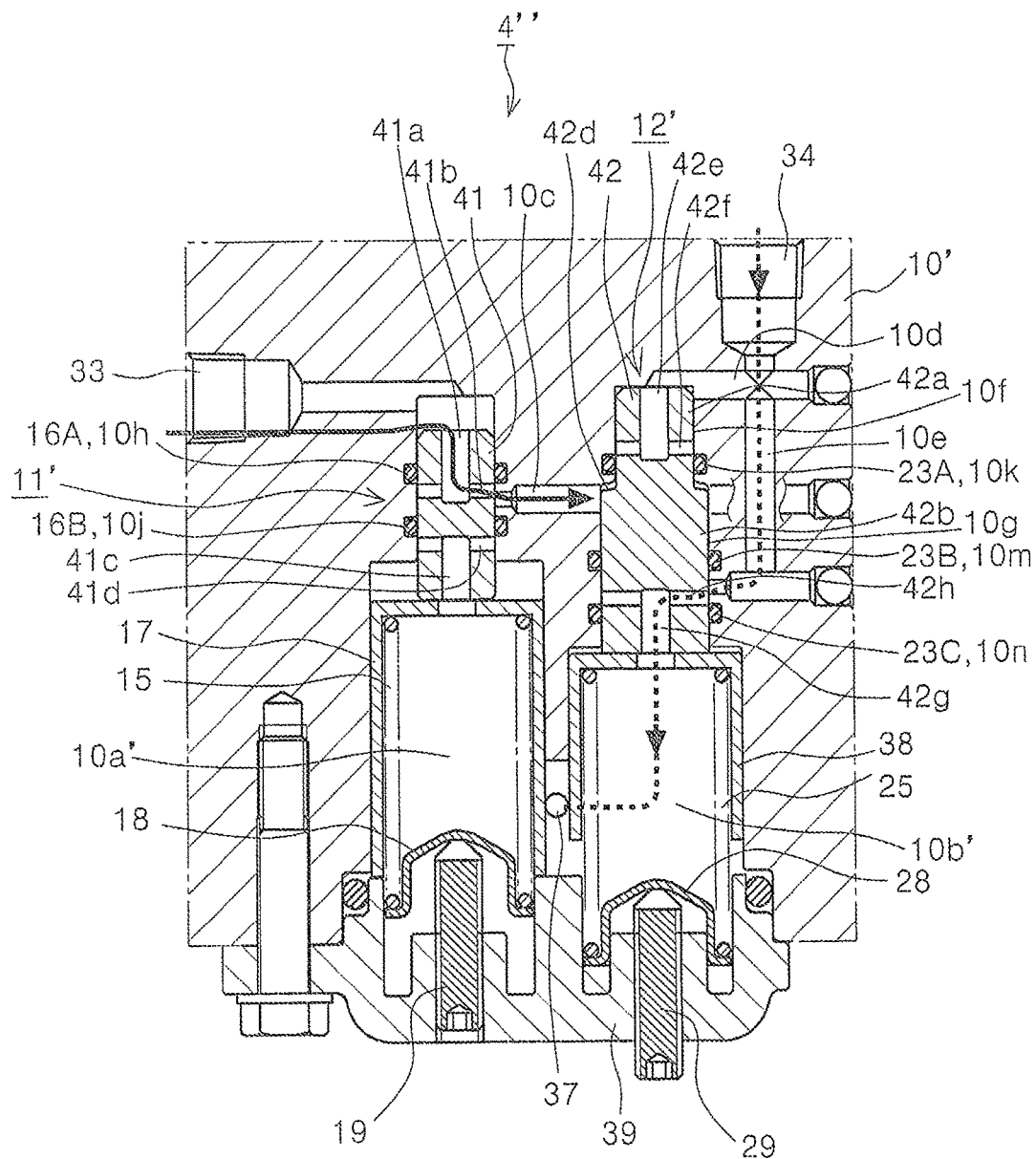
FIG. 15 is a cross-sectional view of the pressure governor according to the third embodiment of the present invention (first valve: open, second valve: closed).

A pressure governor 4" according to a third embodiment of the present invention is next described with reference to FIG. 14 to FIG. 17. FIG. 14 to FIG. 17 are cross-sectional view of the pressure governor 4" according to a third embodiment of the present invention. FIG. 14 shows a state where a first valve 11' is in a closed (valve-closed) position and a second valve 12' is in a closed (valve-closed) position, and FIG. 15 shows a state where the first valve 11' is in an open (valve-open) position and the second valve 12' is in a closed (valve-closed) position.

Figure 16:
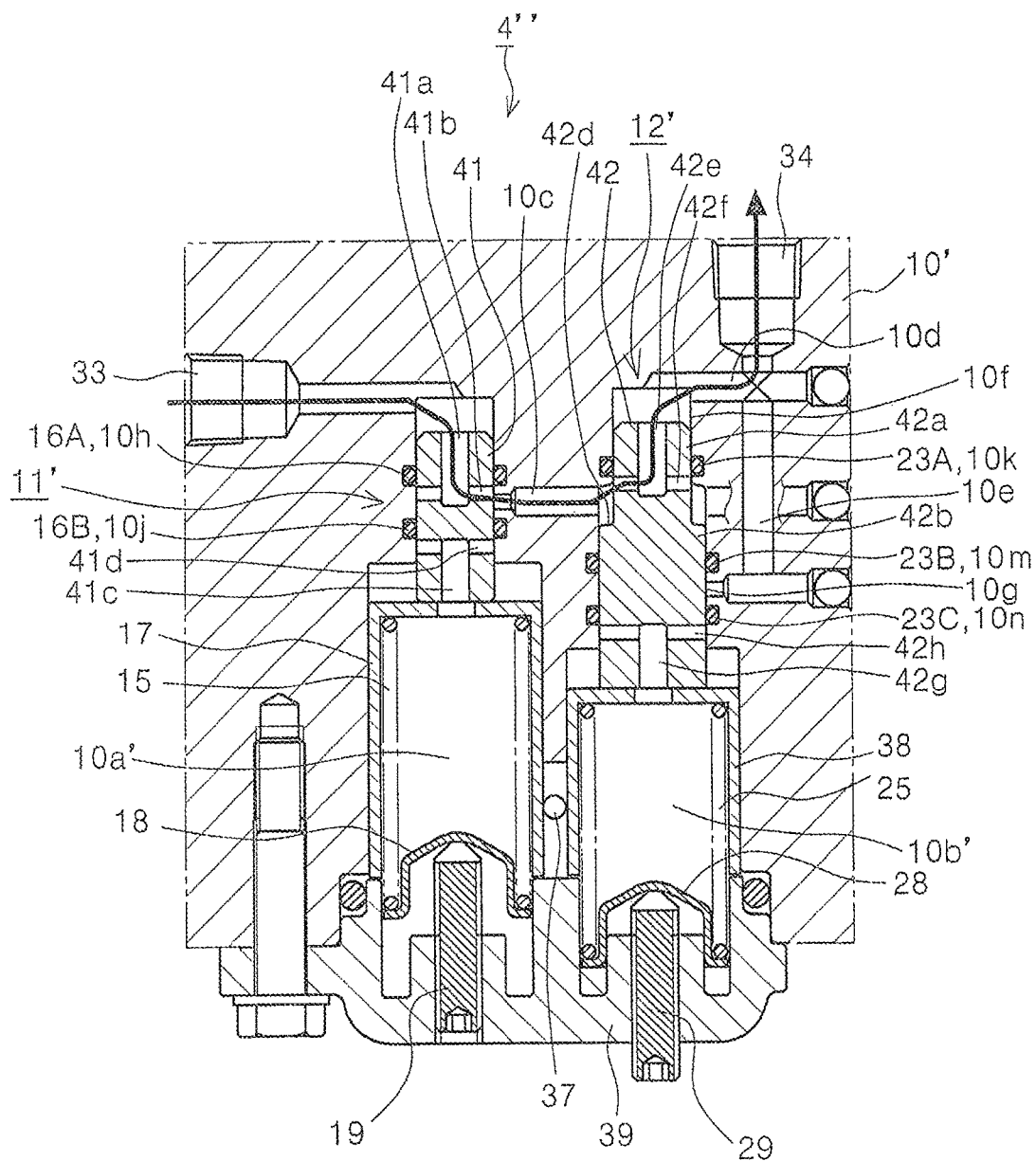
FIG. 16 is a cross-sectional view of the pressure governor according to the third embodiment of the present invention (first valve: open, second valve: open).
Figure 17:
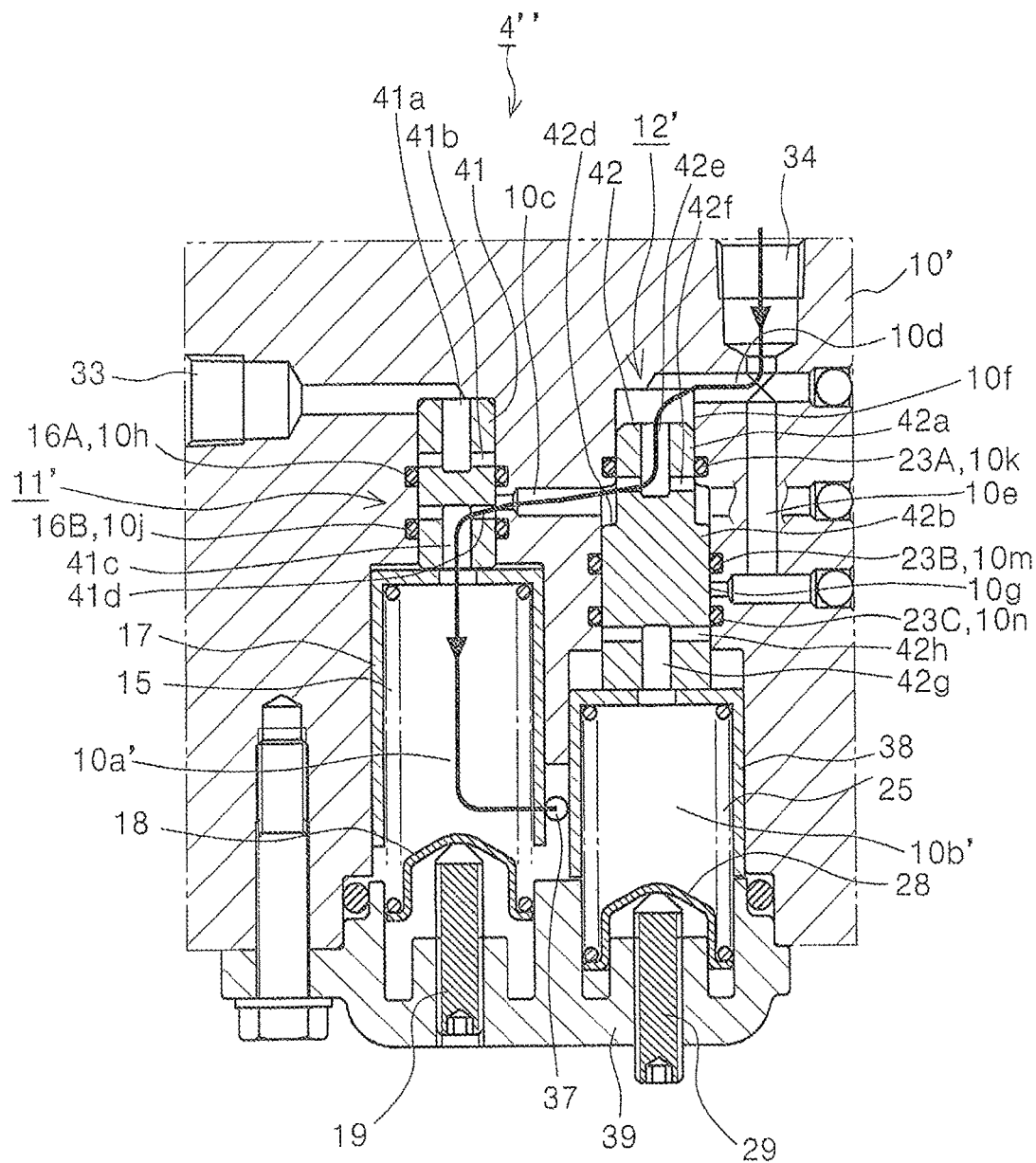
FIG. 17 is a cross-sectional view of the pressure governor according to the third embodiment of the present invention (first valve: closed, second valve: open).
Figure 18:
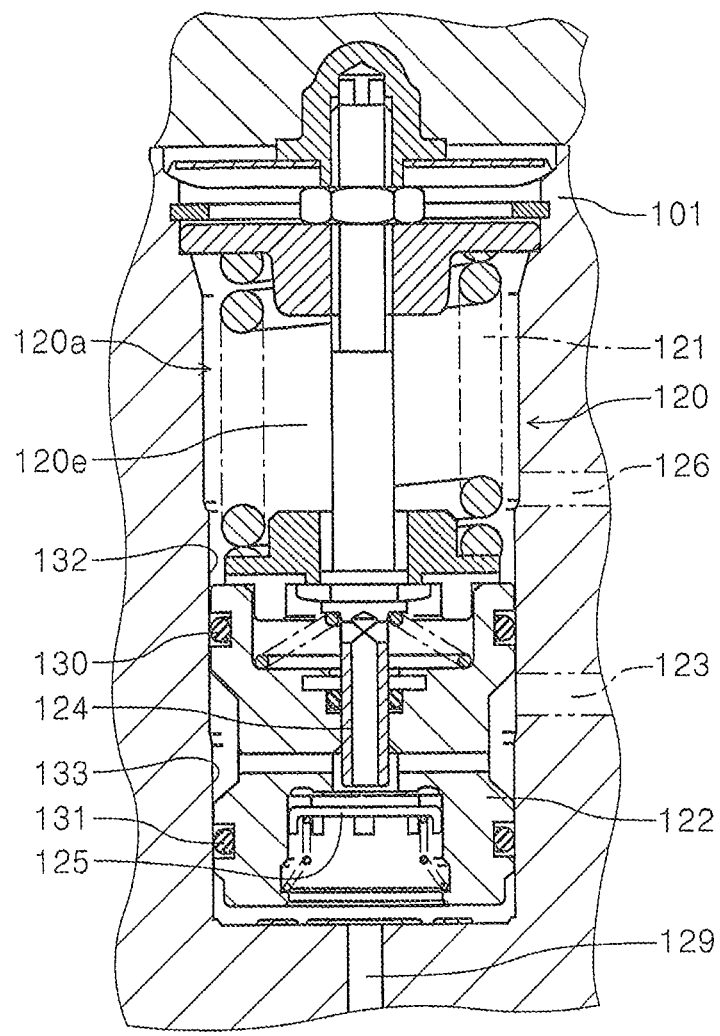
FIG. 18 is a cross-sectional view of a pressure governor according to a related art.

In addition, FIG. 16 shows a state where the first valve 11' is in an open (valve-open) position and the second valve 12' is in an open (valve-open) position, and FIG. 17 shows a state where the first valve 11' is in a closed (valve-closed) position and the second valve 12' is in an open (valve-open) position. The pressure governor 4" operates in the order of FIG. 14→FIG. 15→FIG. 16→FIG. 17→FIG. 14 (the same is repeated hereinafter).

The pressure governor 4" shown in FIG. 14 to FIG. 17 has a normally closed structure as in the case of the pressure governor 4 according to the first embodiment described above but is different from the pressure governor 4 according to the first embodiment in that the seal rings, which are provided on the first and second piston in the first embodiment, are provided on the governor body 10' side.

In addition, the first and second pistons are not pressed directly by the coil springs 15 and 25, respectively, but are pressed via spring seats 17 and 38, respectively. In addition, the exhaust passage communicated with the atmosphere (the exhaust passages 35 and 36 in the first embodiment) is constituted with one exhaust passage 37. In addition, the shape and structure of the first and second pistons are also slightly different in detail. However, there is no difference from the first embodiment in terms of the operation of the entire governor and in the fact that the introducing pressure and the releasing pressure are determined by the first and second valves, respectively. The same components as those of the pressure governor 4 according to the first embodiment are designated by the same reference numerals in FIG. 14 to FIG. 17 and their description is omitted below.

The pressure governor 4" is provided with a first valve 11' in a first valve chamber 10a' formed in a governor body 10' constituting the base body of the pressure governor 4," and the first valve 11' includes a first piston 41, a coil spring 15, spring seats 17, 18, and an adjusting screw 19.

The first piston 41 received in the first valve chamber 10a' has more internal passages (designated by symbols 41a, 41b, 41c, 41d) than the first piston 14 of the first embodiment. The first valve chamber 10a', in which the first valve 11' is received, and a second valve chamber 10b' in which a second valve 12' is received as described later are communicated with each other differing from the first embodiment, and a common exhaust passage 37 is formed between the valve chambers.

Grooves 10h, 10j extending in the circumferential direction of the first piston 41 are formed in the inner periphery of the first valve chamber 10a' with a prescribed distance therebetween in the direction in which the first piston 41 is moved. Seal rings (O-rings) 16A, 16B are received in the grooves 10h, 10j, respectively, whereby a plurality of sealed spaces are defined along the direction in which the first piston 41 slides (in a vertical direction of the drawing).

The second piston 42 received in the second valve chamber 10b' also has a plurality of internal passages (designated by symbols 42e, 42f, 42g, 42h) differing from the second piston 24 according to the first embodiment. Grooves 10k, 10m, 10n extending in the circumferential direction of the second piston 42 are formed in the inner periphery of the second valve chamber 10b' and seal rings (O-ring) 23A, 23B, 23C are received in the grooves 10k, 10m, 10n, respectively, whereby a plurality of sealed spaces are defined along the direction in which the second piston 42 slides (in a vertical direction of the drawing).

The second valve chamber 10b' has a smaller upper diameter in the same manner as the second valve chamber 10b according to the first embodiment. More specifically, the second valve chamber 10b' is constituted with an upper small diameter portion 10f and a lower large-diameter portion 10g, and the second piston 42 includes an upper small diameter portion 42a and a lower large-diameter portion 42b, accordingly. The upper face (designated by symbol 42d) of the large-diameter portion 42b functions as a pressure receiving face for receiving air pressure. In addition, the upper face of the small-diameter portion 42a also functions as a pressure receiving face for receiving air pressure.

In the pressure governor 4'' constituted as described above, the first valve 11' and the second valve 12' are both held in a valve-closed position (both are normally closed) in an early stage of the process of reaching the releasing pressure after reaching the introducing pressure (load mode of the compressor 90). FIG. 14 shows the state during this process. The compressed air is being input into the input port 33 (solid-line arrow in FIG. 14) but the pressure has not reached a level high enough to press down the first piston 41.

At this time, the control output port 34 is communicated with the second valve chamber 10b' and then the exhaust passage 37 via the atmosphere communication path 10e formed in the governor body 10' and the internal passages 42h, 42g formed in the second piston 24. In other words, the control output port 34 is open to the atmosphere (broken-line arrows in FIG. 14).

When the pressure of the compressed air input into the input port 33 increases, the first piston 41 is pressed down and the first valve 11' is opened as shown in FIG. 15. Thus, compressed air flows into the second valve 12' via the internal passages 41a, 41b of the first piston 41 and the passage 10c in the governor body 10' (solid-line arrow in FIG. 15), and the pressure receiving face 42d of the second piston 42 receives the air pressure. In this state, however, the second valve 12' is closed because the releasing pressure of the second valve 12' has not been reached.

When the air pressure further increases and reaches the releasing pressure of the second valve 12', the second piston 42 is pressed down and the second valve 12' is opened as shown in FIG. 16. Then, the airflow path leading from the input port 33 via the first valve 11', the passage 10c, the second valve 12', and a passage 10d, to the control output port 34 is brought into an open state from a shutoff state, and a control order pressure is output from the control output port 34. In this state, air flows toward the large-diameter portion 42b of the second piston 42 through the atmosphere communication path 10e, but the large-diameter portion 42b of the second piston 42 does not receive a force in the valve-opening direction because there is no pressure receiving face corresponding to the pressure receiving face 24d of the second piston 24 in the first embodiment described above.

When the pressure of the compressed air input into the input port 33 gradually decreases and reaches the introducing pressure of the first valve 11', the first valve 11' is closed as shown in FIG. 17. In this state, the compressed air remaining at a downstream side of the control output port 34 is discharged to the atmosphere through the passage 10d, the internal passages 42e, 42f of the second valve 12, the passage 10c, the internal passage 41d, 41c of the first piston 41, the first valve chamber 10a', and the exhaust passage 37 as indicated by solid-line arrows in FIG. 17. Then, when the second piston 42 is restored to its original position, the pressure governor 4 returns to the state shown in FIG. 14 from the state shown in FIG. 17.

As described above, according to the pressure governor 4'' of the third embodiment, because there is no need to form the valve that determines the introducing pressure and the valve that determines the releasing pressure coaxially as in the case with the first embodiment described before, each valve can be easily fabricated with high accuracy by simple processing. Therefore, the production yield can be improved and the cost can be reduced. In addition, because the entire structure of the pressure governor can be simplified, the cost can be further reduced, accordingly.

In addition, the introducing pressure, which is determined by the first valve 11', and the releasing pressure, which is determined by the second valve 12', can be easily adjusted afterward using the adjusting screws 19 and 29, respectively, even after the production is completed. Thus, the production yield can be improved dramatically because there is no fear that a below-standard pressure governor is produced because of production variations.

In addition, because the first valve chamber 10a' and the second valve chamber 10b' in this embodiment are constituted to be closed by a common base 39, the cost can be further reduced, accordingly. In this embodiment, the first valve chamber 10a' and the second valve chamber 10b' have the same inner diameter, and springs, which are made under the same standards but different only in length, are used as the coil springs 15, 25 housed in the valve chambers.

One advantage specific to the third embodiment is that because the seal rings (16A, 16B, 23A to 23C), which provide a seal between a piston and a valve chamber, are provided not on the piston but in the interior wall of the valve and therefore is not moved together with the piston in the first valve 11' and the second valve 12', each seal ring is prevented from unevenly abutting on the interior wall of the valve chamber when the first piston 41 or the second piston 42 is urged to be inclined in the valve chamber. This significantly improves the slidability of the pistons and improves the service life of the seal rings. While this structure is applied to both the first valve 11' and the second valve 12' in this embodiment, the structure may be applied to only one of them.

The invention claimed is:

1. A pressure governor comprising:
an input port into which air is input;
a control output port from which a control order pressure is output to outside the pressure governor;
a first valve provided in a first valve chamber, wherein the first valve opens at a first pressure; and
a second valve provided in a second valve chamber which is in communication with the first valve chamber, wherein the second valve opens at a second pressure, the second valve chamber being provided independently and separately from the first valve chamber, wherein
the pressure governor does not output the control order pressure from the control output port during a first process when an air pressure in the input port increases from the first pressure to the second pressure, which is higher than the first pressure, outputs the control order pressure from the control output port to outside the pressure governor during a second process when the air pressure in the input port is decreased to the first pressure after reaching the second pressure, and stops the output of the control order pressure when the air pressure in the input port returns to the first pressure.

2. The pressure governor according to claim 1, wherein the first valve comprises a first piston for receiving the air pressure from the input port, and first spring by which the first piston is biased in a direction to close the first valve against the air pressure from the input port;

the second valve comprises a second piston for receiving the air pressure from the first valve chamber, and second spring by which the second piston is biased in a direction to close the second valve against the air pressure from the first valve chamber;

the first valve and the second valve are both kept closed or only the first valve is opened from this state during the first process to shut off an airflow path from the input port to the control output port;

the first valve and the second valve are both kept open to keep the airflow path open during the second process; and the first valve is closed to shut off the airflow path when the air pressure is returned to the first pressure.

3. The pressure governor according to claim 2, wherein the first valve chamber is divided by the first piston into, a first end side space in which the first spring is housed, and a second end side space on an opposite side with respect to the first piston, the first end side space being in communication with an atmosphere;

an internal passage is formed in the first piston, which internal passage communicates between the first end side space of the first valve chamber and the second valve chamber, when the first valve is closed; and air on the control output port side is released into the atmosphere through the communication passage and the internal passage, when the air pressure in the input port is returned to the first pressure to close the first valve and before the second valve is closed.

4. A pressure governor comprising:
an input port into which air is input;
a control output port from which a control order pressure is output to outside the pressure governor;
a first valve provided in a first valve chamber to determine a first pressure; and
a second valve provided in a second valve chamber, which is in communication with the first valve chamber to determine a second pressure, wherein
the pressure governor does not output the control order pressure from the control output port during a first process where an air pressure in the input port increases from the first pressure to the second pressure, which is higher than the first pressure, outputs the control order pressure from the control output port to outside the pressure governor during a second process where the air pressure in the input port decreases to the first pressure after reaching the second pressure, and stops the output of the control order pressure when the air pressure in the input port returns to the first pressure,
the first valve comprises a first piston for receiving the air pressure from the input port, and first spring by which the first piston is biased in a direction to close the first valve against the air pressure from the input port, the second valve comprises a second piston for receiving the air pressure from the first valve chamber, and second spring by which the second piston is biased in a direction to close the second valve against the air pressure from the first valve chamber, the first valve and the second valve are both kept closed or only the first valve is opened from this state during the first process to shut off an airflow path from the input port to the control output port, the first valve and the second valve are both kept open to keep the airflow path open during the second process, the first valve is closed to shut off the airflow path when the air pressure is returned to the first pressure, the first valve chamber is divided by the first piston into, a first end side space in which the first spring is housed, and a second end side space on an opposite side with respect to the first piston, the first end side space being in communication with an atmosphere, an internal passage is formed in the first piston, which internal passage communicates between the first end side space of the first valve chamber and the second valve chamber, when the first valve is closed, and air on the control output port side is released into the atmosphere through the communication passage and the internal passage, when the air pressure in the input port is returned to the first pressure to close the first valve and before the second valve is closed, the second valve chamber is divided by the second piston into, a first end side space in which the second spring is housed, and a second end side space on the opposite side with respect to the second piston, the first end side space being in communication with the atmosphere, an atmosphere communication path, which communicates the control output port with the first end side space of the second valve chamber to open the control output port to the atmosphere with the second valve closed, is formed in the valve body of the pressure governor, and the atmosphere communication path is shut off by the second piston when the second piston is moved to open the second valve.

5. The pressure governor according to claim 2, wherein at least one of, a seal ring which performs a sealing function between an interior wall of the first valve chamber and the first piston, and a seal ring which performs a sealing function between an interior wall of the second valve chamber and the second piston, is provided in the interior wall of the corresponding valve chamber.

6. An air dryer for drying air comprising the pressure governor according to claim 1.

7. The pressure governor according to claim 3, wherein at least one of, a seal ring which performs a sealing function between an interior wall of the first valve chamber and the first piston, and a seal ring which performs a sealing function between an interior wall of the second valve chamber and the second piston, is provided in the interior wall of the corresponding valve chamber.

8. The pressure governor according to claim 4, wherein at least one of, a seal ring which performs a sealing function between an interior wall of the first valve chamber and the first piston, and a seal ring which performs a sealing function between an interior wall of the second valve chamber and the second piston, is provided in the interior wall of the corresponding valve chamber.

9. An air dryer for drying air comprising the pressure governor according to claim 2.

10. An air dryer for drying air comprising the pressure governor according to claim 3.

11. An air dryer for drying air comprising the pressure governor according to claim 4.

12. An air dryer for drying air comprising the pressure governor according to claim 5.

13. The air dryer according to claim 7, further comprising a passage for the air provided between the first valve and the second valve, wherein
the releasing pressure is determined in a state where the introducing pressure acts on the second valve via the passage.

14. A braking device for a vehicle comprising the air dryer according to claim 13.

15. A vehicle comprising the air dryer according to claim 13.

16. The pressure governor according to claim 1, wherein an axis of the second valve chamber is provided separately from an axis of the first valve in a direction normal to the axis.

17. The pressure governor according to claim 1, wherein during the first process, an airflow path is continuously formed from the input port to the control output port.

* * * * *